US011410480B2

(12) United States Patent
Saito et al.

(10) Patent No.: US 11,410,480 B2
(45) Date of Patent: Aug. 9, 2022

(54) INFORMATION PROCESSING APPARATUS, INFORMATION PROCESSING METHOD, STORAGE MEDIUM, AND INFORMATION PROCESSING SYSTEM

(71) Applicant: NEC Corporation, Tokyo (JP)

(72) Inventors: Yasuji Saito, Tokyo (JP); Nobuyuki Ikuta, Tokyo (JP); Hajime Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/287,209

(22) PCT Filed: Oct. 29, 2019

(86) PCT No.: PCT/JP2019/042373
§ 371 (c)(1),
(2) Date: Apr. 21, 2021

(87) PCT Pub. No.: WO2020/090815
PCT Pub. Date: May 7, 2020

(65) Prior Publication Data
US 2021/0383627 A1 Dec. 9, 2021

(30) Foreign Application Priority Data
Oct. 31, 2018 (JP) .............................. JP2018-205060

(51) Int. Cl.
G07C 9/00 (2020.01)
G07C 9/20 (2020.01)
(Continued)

(52) U.S. Cl.
CPC .............. G07C 9/20 (2020.01); G06F 21/35 (2013.01); G06F 21/36 (2013.01);
(Continued)

(58) Field of Classification Search
CPC .......... G06F 21/36; G06F 21/45; G06F 21/31; G06F 21/32; G06F 21/608; G06F 21/645;
(Continued)

(56) References Cited

U.S. PATENT DOCUMENTS

2013/0124855 A1* 5/2013 Varadarajan ............ G06F 21/31
713/155
2017/0257358 A1* 9/2017 Ebrahimi .............. H04L 9/3297
(Continued)

FOREIGN PATENT DOCUMENTS

CN 103337110 A 10/2013
CN 108198296 A 6/2018
(Continued)

OTHER PUBLICATIONS

International Search Report of PCT Application No. PCT/JP2019/042373 dated Jan. 21, 2020.
(Continued)

Primary Examiner — Dionne Pendleton

(57) ABSTRACT

An information processing apparatus includes: a connection unit that establishes connection to a user terminal by wireless communication; an acquisition unit that acquires terminal identification information transmitted from the user terminal via the wireless communication when the user terminal has read an image used for a request for entry to a control target area; and a determination unit that determines whether or not to permit a user carrying the user terminal to enter the control target area based on the terminal identification information.

11 Claims, 20 Drawing Sheets

(51) Int. Cl.
*G06F 21/35* (2013.01)
*G06F 21/36* (2013.01)
*G07C 9/28* (2020.01)

(52) U.S. Cl.
CPC ........... *G07C 9/00309* (2013.01); *G07C 9/28* (2020.01); *G07C 2009/00769* (2013.01)

(58) Field of Classification Search
CPC .... G06F 3/1222; G06F 3/1236; G06F 3/1238; G06F 3/1292; G06F 21/35; G06K 19/06037; G06K 7/1417; H04L 2209/80; H04L 9/0819; H04L 9/0863; H04L 9/3228; H04L 63/0876; H04L 2209/38; H04L 2209/56; H04L 29/06; H04L 63/0435; H04L 63/0442; H04L 63/061; H04L 63/08; H04L 63/083; H04L 63/0853; H04L 63/0861; H04L 63/105; H04L 9/3234; H04L 9/3236; H04L 9/3247; H04L 9/3271; H04L 9/3297; H04M 1/725; H04M 15/06; H04M 2207/203; H04M 3/38; H04M 7/0081; G07C 9/00174; G07C 9/00182; G07C 9/00904; G07C 2009/00793; G07C 2209/63; G07C 9/00309; G07C 2009/00769; G07C 9/00; G07C 9/20; G07F 17/13; G07F 19/20; G07F 7/06; G07F 7/12; G08B 13/1472; G08B 13/19682; G08B 13/2454; G08B 13/248; H04N 1/00307; H04N 1/00411; H04N 1/4413; H04N 2201/0094; H04W 12/04; H04W 12/06; H04W 12/37; H04W 12/50; H04W 12/71; H04W 12/77; G06Q 10/0836; G06Q 10/0837; G06Q 10/087; G06Q 20/3276; G06Q 20/3829; G06Q 20/40; G06Q 30/0203; G06N 20/00; G06N 5/003; G06N 5/046; G06N 7/005; E05B 49/00

See application file for complete search history.

(56) References Cited

U.S. PATENT DOCUMENTS

2020/0099892 A1\* 3/2020 Erol .................... H04L 65/4069
2021/0241551 A1\* 8/2021 Loeshelle .......... G07C 9/00309

FOREIGN PATENT DOCUMENTS

| CN | 108537479 A | 9/2018 |
| CN | 108597132 A | 9/2018 |
| JP | 2005120579 A | 5/2005 |
| JP | 2005207157 A | 8/2005 |
| JP | 2006104801 A | 4/2006 |
| JP | 2014232357 A | 12/2014 |
| JP | 2016044402 A | 4/2016 |
| JP | 2016075060 A | 5/2016 |
| JP | 2018145601 A | 9/2018 |

OTHER PUBLICATIONS

Chinese Office Action for CN Application No. 201980072103.X dated Jun. 6, 2022 with English Translation.

\* cited by examiner

| USER ID | NAME | MAC ADDRESS | START OF AVAILABLE DATE AND TIME | END OF AVAILABLE DATE AND TIME | ENABLE FLAG | KEY INFORMATION | | |
|---|---|---|---|---|---|---|---|---|
| | | | | | | BOX1 | BOX2 | ... |
| 15001 | [NAME 1] | [MAC ADDRESS 1] | 2018/07/18 0:00 | 2018/11/18 24:00 | ON | 12345 | 67890 | ... |
| 15002 | [NAME 2] | [MAC ADDRESS 2] | 2018/10/18 0:00 | 2018/12/18 24:00 | ON | 34567 | 12343 | ... |
| 15003 | [NAME 3] | [MAC ADDRESS 3] | 2018/10/15 0:00 | 2018/11/18 24:00 | OFF | 98765 | – | ... |
| ... | ... | ... | ... | ... | ... | ... | ... | ... |

| MAC ADDRESS | AVAILABLE PERIOD | ENABLE FLAG | KEY NUMBER | ARTICLE POSITION | VOUCHER NUMBER | ... |
|---|---|---|---|---|---|---|
| [MAC ADDRESS 1] | 2018/10/25 12:00 - 2018/10/26 20:00 | ON | 12345 | A25 | [VOUCHER NUMBER 1] | ... |
| [MAC ADDRESS 2] | 2018/10/25 12:00 - 2018/10/26 20:00 | ON | 34567 | B32 | [VOUCHER NUMBER 2] | ... |
| ... | ... | ... | ... | ... | ... | ... |

INFORMATION PROCESSING APPARATUS, INFORMATION PROCESSING METHOD, STORAGE MEDIUM, AND INFORMATION PROCESSING SYSTEM

This application is a National Stage Entry of PCT/JP2019/042373 filed on Oct. 29, 2019, which claims priority from Japanese Patent Application 2018-205060 filed on Oct. 31, 2018, the contents of all of which are incorporated herein by reference, in their entirety.

TECHNICAL FIELD

The present invention relates to an information processing apparatus, an information processing method, a storage medium, and an information processing system.

BACKGROUND ART

Patent Literature 1 discloses an access control system formed of an access control apparatus that controls an electric lock of a door provided at an entrance of a facility, a sign apparatus such as a two-dimensional barcode installed at or near the entrance of the facility, a server that manages information on entry to and exit from the facility, and a user terminal carried by the user of the facility. In this system, the user terminal receives a facility ID, which identifies a facility, from the server and stores the facility ID in a storage device. Then, if a facility ID read from the sign apparatus and the stored facility ID are matched, the user terminal outputs an unlock control signal for the electric lock to the access control apparatus.

CITATION LIST

Patent Literature

PTL 1: Japanese Patent Application Laid-open No. 2016-44402

SUMMARY OF INVENTION

Technical Problem

In the system disclosed in Patent Literature 1, a user terminal outputs an unlock control signal to the access control apparatus based on a result of an authentication process at the user terminal. However, the user terminal is a terminal that is managed by a user rather than a manager of the system. Thus, there is room for improvement in terms of security in a system configuration having, on the user terminal side, a function of outputting an unlock control signal.

Accordingly, in view of the problem described above, the example object of the present invention is to provide an information processing apparatus, an information processing method, a storage medium, and an information processing system that can ensure security in control of entry to the control target area.

Solution to Problem

According to one example aspect of the present invention, provided is an information processing apparatus including: a connection unit that establishes connection to a user terminal by wireless communication; an acquisition unit that acquires terminal identification information transmitted from the user terminal via the wireless communication when the user terminal read an image used for a request for entry to a control target area; and a determination unit that determines whether or not to permit a user carrying the user terminal to enter the control target area based on the terminal identification information.

According to another example aspect of the present invention, provided is an information processing method including: establishing connection to a user terminal by wireless communication; acquiring terminal identification information transmitted from the user terminal via the wireless communication when the user terminal read an image used for a request for entry to a control target area; and determining whether or not to permit a user carrying the user terminal to enter the control target area based on the terminal identification information.

According to yet another example aspect of the present invention, provided is a storage medium storing a program that causes a computer to perform: establishing connection to a user terminal by wireless communication; acquiring terminal identification information transmitted from the user terminal via the wireless communication when the user terminal read an image used for a request for entry to a control target area; and determining whether or not to permit a user carrying the user terminal to enter the control target area based on the terminal identification information.

According to yet another example aspect of the present invention, provided is an information processing system including: a user terminal carried by a user and having a function of reading an image used for a request for entry to a control target area; and an information processing apparatus that wirelessly communicates with the user terminal, and the information processing apparatus includes a connection unit that establishes connection to the user terminal by the wireless communication, an acquisition unit that acquires terminal identification information transmitted via the wireless communication from the user terminal that read the image, and a determination unit that determines whether or not to permit the user to enter the control target area based on the terminal identification information.

Advantageous Effects of Invention

According to the present invention, an information processing apparatus, an information processing method, a storage medium, and an information processing system that can ensure security in control of entry to the control target area are provided.

DESCRIPTION OF EMBODIMENTS

Exemplary example embodiments of the present invention will be described below with reference to the drawings. Throughout the drawings, the same components or corresponding components are labeled with the same references, and the description thereof may be omitted or simplified.

First Example Embodiment

Figure 1:
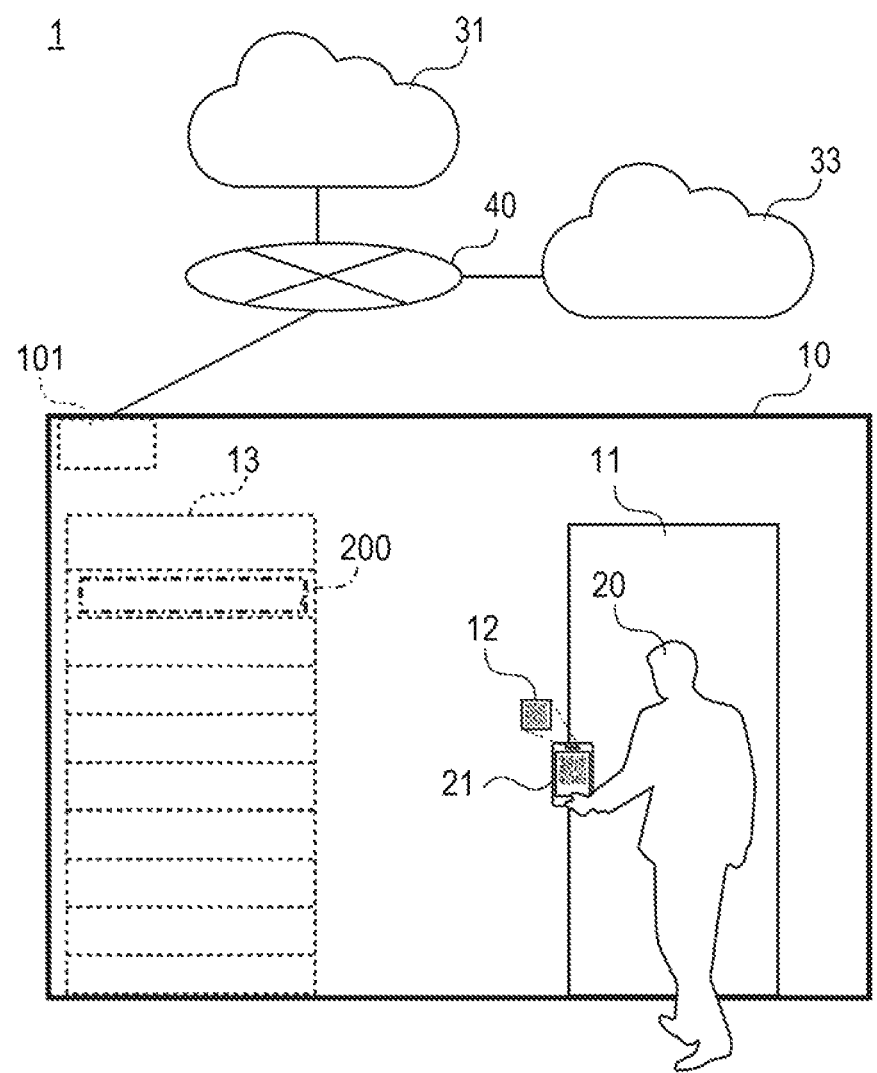
FIG. 1 is a diagram illustrating an overview of a delivery management system in a first example embodiment.

FIG. 1 a diagram illustrating an overview of a delivery management system 1 in the present example embodiment. The delivery management system 1 is an information processing system that manages article delivery in a control target area where a plurality of articles 200 are stored. Description will be provided below with a storage room 10 as an example of the control target area. The storage room 10 is a cargo container-type facility and is installed in a corner of a parking lot of a shop such as a convenience store.

When purchasing the article 200 at an EC site, the user may designate pickup at the storage room 10 as a way to pick up the article 200. The article 200 designated for pickup at the storage room 10 is distributed to the storage room 10 by a logistics company affiliated with the EC site. In response to completion of distribution of the article 200 to the storage room 10, a message such as an electronic mail indicating the completion of distribution is transmitted from a company server 33 to a user terminal 21. The company server 33 is a cloud server operated by a logistics company. The user terminal 21 is a mobile information terminal such as a smartphone.

Once an electronic mail is received at the user terminal 21, a user 20 carries the user terminal 21 and comes to the storage room 10 to pick up the article 200. In the user terminal 21, an application used for performing access control and article delivery confirmation in the storage room 10 (hereafter, referred to as "dedicated application") is installed. The dedicated application may be downloaded from the company server 33, for example.

The user 20 starts up the dedicated application in the user terminal 21 when coming to picking up the article 200. Note that the dedicated application may be started up automatically when a predetermined signal is received from a management server 31 or the like or when a specified time to pick up the article 200 arrives.

When the user 20 approaches a place within a predetermined distance (for example, within 33 m) from the storage room 10, the dedicated application in the user terminal 21 establishes wireless communication by a short-distance wireless scheme (for example, Bluetooth (registered trademark), Wi-Fi, or the like) with an edge gateway (hereafter, referred to as "edge GW") 101 installed in the storage room 10. The user 20 selects a key number corresponding to the storage room 10 in a window of the dedicated application of the user terminal 21. The key number is a code set and registered in advance by the user 20 for each storage room 10. A registration method of a key number will be described later.

Then, after arriving at the entrance of the storage room 10, the user 20 uses and causes a camera function of the user terminal 21 to read an image of a keyhole seal 12 attached near a door 11 of the storage room 10. The keyhole seal 12 is a sign member indicating the storage room 10 but may be a member other than a seal. In the image in the present example embodiment, a startup code of an authentication request process for the dedicated application is recorded. That is, this image is an image used for requesting entry to the storage room (control target area) 10 from the edge GW 101. Further, in the example of FIG. 1, while the image is a two-dimensional barcode, the type of the image is not limited thereto. The image may be any image that is detected by the dedicated application as a particular sign present near a control target region. The image may be a one-dimensional barcode, a figure, or the like, for example. Further, no identification information on the storage room 10 is recorded in the image of the keyhole seal 12 of the present example embodiment. Accordingly, for example, even when a plurality of storage rooms 10 are provided together to one shop, a common keyhole seal 12 can be used for respective storage rooms 10.

Further, the user terminal 21 transmits authentication information including a key number and terminal identification information to the edge GW 101 and requests authentication of the user 20 in response to completion of reading of an image (startup code) of the keyhole seal 12 as a trigger. Then, in response to authenticating the user 20, the edge GW 101 unlocks the door 11. This enables the user to enter the storage room 10.

After the user 20 enters the storage room 10, the door 11 is once locked in order to prevent unauthorized taking-out of the article 200. Further, when an open state of the door 11 continues for a predetermined time or longer, it is preferable to call attention by voice or the like. The user 20 takes the article 200, the recipient of which is the user 20 (hereafter, referred to as "target article"), out of the articles 200 stored on the shelf 13 in accordance with a guidance mail notified to the user terminal 21 or voice guidance in the room when the user 20 is in the room.

In response to confirming that the user 20 has picked up a target article in the storage room 10, the edge GW 101 permits the user 20 to exit the room. Herein, the term "permit" refers to outputting an unlock signal for the door 11 (a drive control signal for a bar in a case of a passage restriction apparatus (not illustrated) such as a crossing gate). This enables the door 11 to be unlocked. After the door 11 is unlocked, the user 20 takes out the target article and exits the storage room 10.

Figure 2:
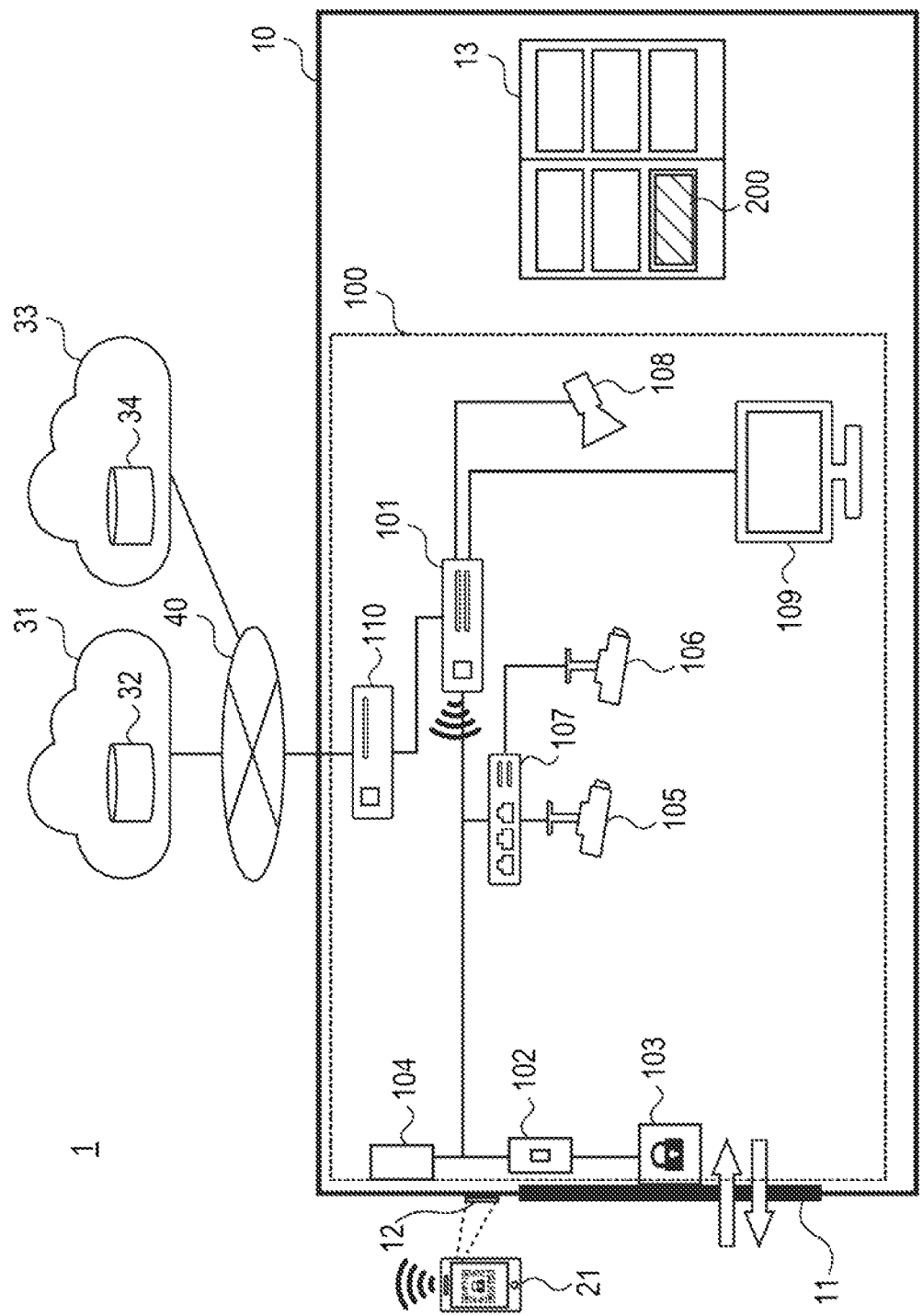
FIG. 2 is a schematic diagram illustrating an overall configuration of the delivery management system in the first example embodiment.

FIG. 2 is a schematic diagram illustrating an overall configuration of the delivery management system in the present example embodiment. The delivery management system 1 has the edge GW 101, an exit button 102, an electric lock 103, a telephone 104, a live camera 105, a shelf camera 106, a hub 107, an audio terminal 108, a display 109, and a router 110. The edge GW 101, the exit button 102, the telephone 104, the live camera 105, the shelf camera 106, the hub 107, the audio terminal 108, the display 109, and the router 110 are installed inside the storage room 10. The electric lock 103 is installed integrally with the door 11 that is the entrance and exit of the storage room 10. Further, the shelf 13 in which the plurality of articles 200 are arranged is installed inside the storage room 10.

The edge GW 101 is a computer apparatus that controls the overall delivery management system 1 in the storage room 10. Information related to the user 20 who is permitted to enter the storage room 10 (hereafter, referred to as "permission information") is registered in the edge GW 101 in advance. Specifically, identification information or the like on the user terminal 21 associated with the user 20 whose purchased article 200 is stored inside the storage room 10 is registered. The edge GW 101 performs authentication of the user 20 by matching information included in an authentication request received from the user terminal 21 with the permission information. In response to authenticating the user 20, the edge GW 101 outputs an unlock signal to the electric lock 103. Further, the edge GW 101 collects data from the live camera 105 and the shelf camera 106 and performs processing, analysis, or the like on the collected data. The collected data is transmitted from the edge GW 101 to the management server 31 via the router 110. The edge GW 101 may also transfer various information to the user 20 via the audio terminal 108 or the display 109. Note that the article 200 that can be associated with the user 20 of the user terminal 21 in advance is not limited to the purchased article in storage, and a particular article 200 may be associated with the user 20 of the user terminal 21.

The exit button 102 is a button used when the user 20 present in the room exits the storage room 10. In response to the exit button 102 being pressed, the edge GW 101 outputs an unlock signal to the electric lock 103. Note that the exit button 102 of the present example embodiment is set to an available state when exit from the room is permitted at the edge GW 101.

The electric lock 103 is formed of an actuator such as a solenoid, for example, a dead bolt (gate bar) moved by an actuator, an open/closure sensor, or the like. The electric lock 103 moves the position of the dead bolt in response to an unlock signal from the edge GW 101 and thereby enables the door 11 to be opened or closed. Further, the electric lock 103 can also detect open or closure of the door 11 in accordance with a signal from the open/closure sensor (not illustrated). Note that the electric lock 103 is normally locked and may be unlocked only when the user 20 is authenticated by the edge GW 101.

The telephone 104 is a direct connect telephone by which the user 20 communicates with an operator in case of emergency or the like. Further, when the exit button 102 described above is pressed for multiple times when not being in an active state, the telephone 104 may be ringed by the operator.

The live camera 105 is a network camera used for monitoring and is used for capturing a moving image of behavior of the user 20 who has entered the room. The live camera 105 is connected to the edge GW 101 via the hub 107, and the captured image data (live image) is stored in the edge GW 101. The image data may be stored in a predetermined file format in order to prevent alteration.

The shelf camera 106 is a network camera used for watching the shelf and is used for capturing the entire shelf 13 and detecting the arrangement of the article(s) 200 accommodated in the shelf 13. The shelf camera 106 is connected to the edge GW 101 via the hub 107, the captured image data (shelf image) is stored in the edge GW 101. The shelf camera 106 has a wide view angle of 100 degrees or greater, for example, and can include the entire shelf 13 within one frame. Further, the shelf camera 106 can capture a full high definition (HD) image of 1920 by 1080 pixels, for example, and can record information (a shelf label, a voucher, or the like) attached to the shelf 13 and the article 200 in a high quality image.

The hub 107 is an interface unit based on a communication specification such as Ethernet (registered trademark), for example, and connects the edge GW 101, the live camera 105, and the shelf camera 106 to each other.

The audio terminal 108 is a speaker, for example, and is used for guiding the user who has entered the storage room 10 by voice. The audio terminal 108 is connected to the edge GW 101 and outputs voice in accordance with audio data from the edge GW 101. The audio terminal 108 may be a robotic apparatus that can perform communication by voice in addition to a speaker.

The display 109 is a liquid crystal display or an organic electro luminescence (EL) display, for example, and is used for guiding the user who has entered the storage room 10 by using an image. The display 109 is connected to the edge GW 101 and performs display in accordance with image data from the edge GW 101. For example, the position of the article(s) 200 on the shelf 13 is animated on the display 109. The display 109 may be configured to cooperate with the audio terminal 108 to provide guidance. Further, the display 109 may be a touch panel and can accept touch entry performed by the user 20.

The router 110 has a third generation (3G)/Long Term Evolution (LTE) module, a wireless local area network (LAN), or the like, establishes connection to the management server 31 via a network 40, and controls data communication between the edge GW 101 and the management server 31. The router 110 may be one connected to the network 40 in a wired manner or may be built in the edge GW 101.

The management server 31 is a so-called cloud server and is connected to the edge GW 101 via the network 40 and the router 110. The management server 31 can transmit and receive data to and from the company server 33 by using application programming interface (API). The management server 31 has a database (DB) 32, and the database 32 stores a use history (entry/exit history), a shelf image, or a live image received from the edge GW 101, information received from the company server 33, or the like.

The company server 33 is a so-called cloud server and is connected to the management server 31 via the network 40. The company server 33 can transmit and receive data to and from the management server 31 by using API. The company server 33 is operated by a logistics company and manages personal information on the user 20, article information indicating association between the user 20 and the article 200 (such as a voucher number), the distribution status of the article 200, or the like. Note that the number of company servers 33 is not limited, and servers of a plurality of different companies may be installed on the cloud.

The network 40 is a wide area communication network such as the Internet, for example, and also includes a mobile communication network, a base station, or a relay server of the LTE or the like. A distributor worker terminal such as a smartphone, a tablet computer, or the like operated by a distributor worker of a logistics company may also be connected to the network 40 in addition to the user terminal 21.

Figure 3:
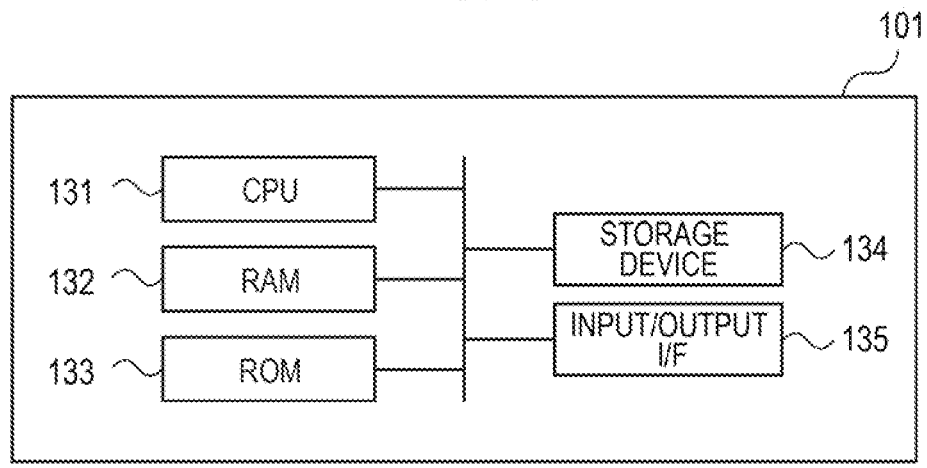
FIG. 3 is a block diagram illustrating a hardware configuration example of an edge gateway in the first example embodiment.

FIG. 3 is a block diagram illustrating a hardware configuration example of the edge GW 101 in the present example embodiment. The edge GW 101 has a central processing unit (CPU) 131, a random access memory (RAM) 132, a read only memory (ROM) 133, a storage device 134, and an input/output interface (I/F) 135. The CPU 131 controls a device connected to the edge GW 101 in accordance with a program stored in the ROM 133 or the storage device 134 and performs a predetermined process such as collection, processing, analysis, or the like on data.

The RAM 132 is formed of a volatile memory and provides a memory region required for the operation of the CPU 131. The ROM 133 is formed of a nonvolatile memory and stores a program, data, or the like required for operating the edge GW 101. The storage device 134 is formed of a solid state drive (SSD), a hard disk drive (HDD), or the like. The storage device 134 stores in advance an application program used for image recognition, audio data and image data used for guidance, or the like. Further, the storage device 134 stores permission information, a use history, a shelf image, a live image, purchase information, or the like as required. The CPU 131, the RAM 132, and the ROM 133 may function as a connection unit, an acquisition unit, a determination unit, a deletion unit, a notification unit, and an output unit, and the storage device 134 may function as a storage unit.

The input/output I/F 135 is a wired interface based on a specification such as Universal Serial Bus (USB), Ethernet, RS-232C, RS-485, or the like, and the hub 107, the audio terminal 108, the display 109, and the router 110 are connected thereto. Any device can be connected to the input/output I/F 135, and a human-detection sensor, a microphone, a temperature and humidity sensor, a sensor that senses a malfunction of a device, or the like may be connected thereto, for example.

Note that the hardware configuration illustrated in FIG. 3 is an example, a device other than the above may be added, or some of the devices may not be provided. For example, a part of the function of the edge GW 101 may be provided by another device.

Figure 4:
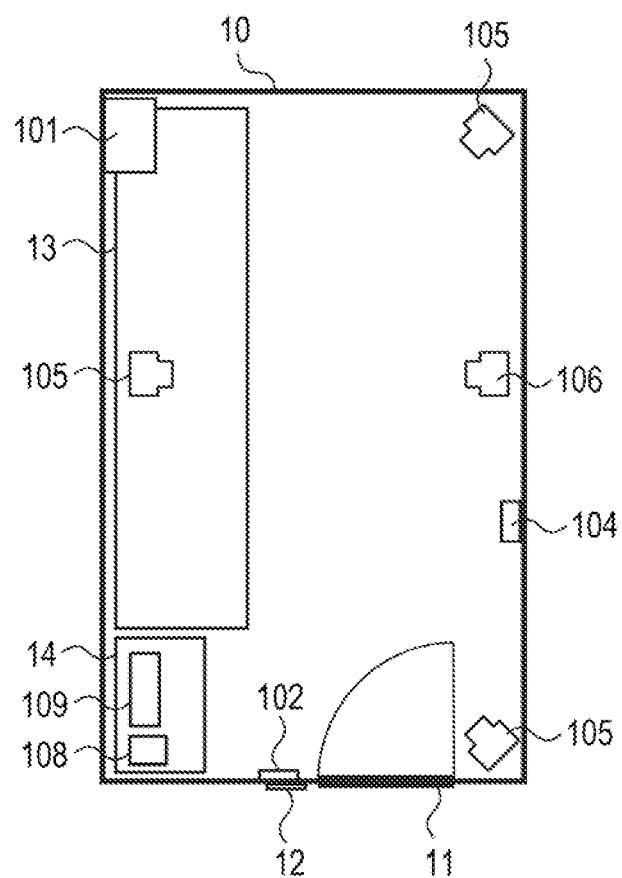
FIG. 4 is a plan view of a storage room in the first example embodiment.

FIG. 4 is a plan view of the storage room 10 in the present example embodiment. The storage room 10 is a unit house having an area of about 9.9 square meters, for example, and the door 11 is provided as the only entrance. The door 11 is locked by the electric lock 103, and only the user 20 permitted by the edge GW 101 can enter and exit the room. The shelf 13 used for accommodating the plurality of articles 200 is installed inside the storage room 10 and along the wall of the storage room 10. A guidance table 14 is installed near the shelf 13, and the audio terminal 108 and the display 109 are placed on the guidance table 14. In order for the user 20 to easily recognize the display 109 visually when entering the storage room 10 from the door 11, the guidance table 14 is installed in front of the shelf 13 when viewed from the door 11 side.

Each live camera 105 is installed above the corner or the like inside the storage room 10 so that the entire storage room 10 is included in the view angle. The shelf camera 106 is installed on a wall or the like facing the front of the shelf 13 so that the entire shelf 13 is included in the view angle.

In the storage room 10, a clock (not illustrated) may be further installed within the view angle of the live camera 105. By using the clock, the operator monitoring the image from the live camera 105 is able to easily confirm that the live camera 105 is normally operating. Furthermore, if an identification number (location code) of the storage room 10 is indicated near the clock, the installation place of the storage room 10 is readily recognized, and this facilitates a countermeasure when an anomaly occurs.

Figure 5:
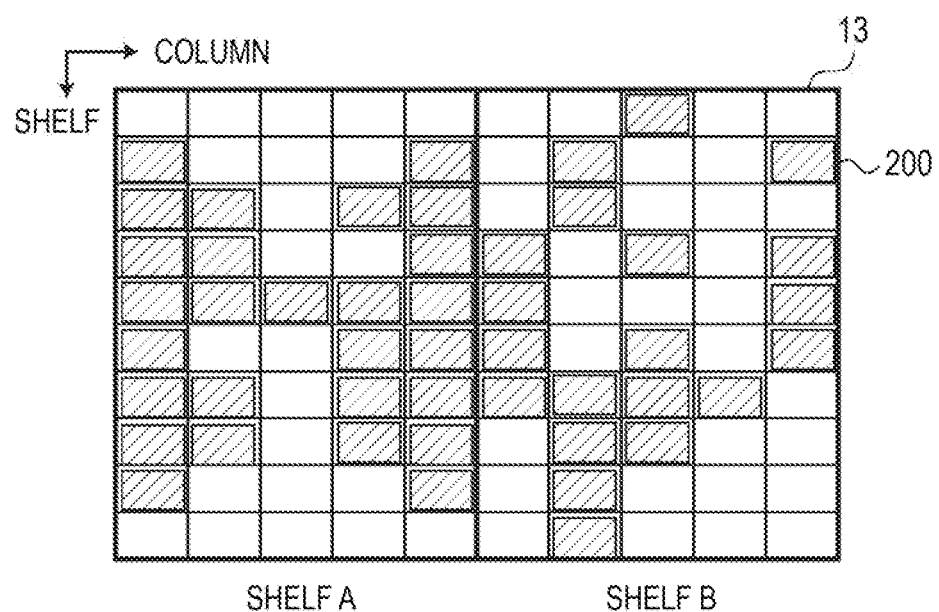
FIG. 5 is a front view of shelves in the first example embodiment.

FIG. 5 is a front view of the shelf 13 in the present example embodiment. As illustrated in FIG. 5, the shelf 13 is partitioned into 10 columns and 10 shelves in the horizontal direction and the vertical direction, respectively. A single article 200 can be accommodated in each partitioned compartment, and the maximum 100 articles 200 can be accommodated in the entire shelf 13.

It is preferable that the size of each compartment of the shelf 13 be designed in accordance with the specification of the packing cardboard used by the logistics company. That is, it is preferable that the size of each compartment be slightly larger than a specification of a box in accordance with the specification such as the 60-size, the 80-size, or the like often used in logistics. As an example, the size of each compartment may be a width of 27 cm, a height of 19 cm, and a depth of 32 cm.

The shelf 13 is formed of a shelf A and a shelf B partitioned into the same size of compartments in the example of FIG. 5, however, while the size of each compartment of the shelf A may be designed in accordance with the 60-size, the size of each compartment of the shelf B may be designed in accordance with the 80-size, for example. Further, some partitions of the shelf 13 may be removable and a single article 200 may be accommodated by using a plurality of compartments so that the article 200 packed in a larger box can be accommodated.

Figure 6:
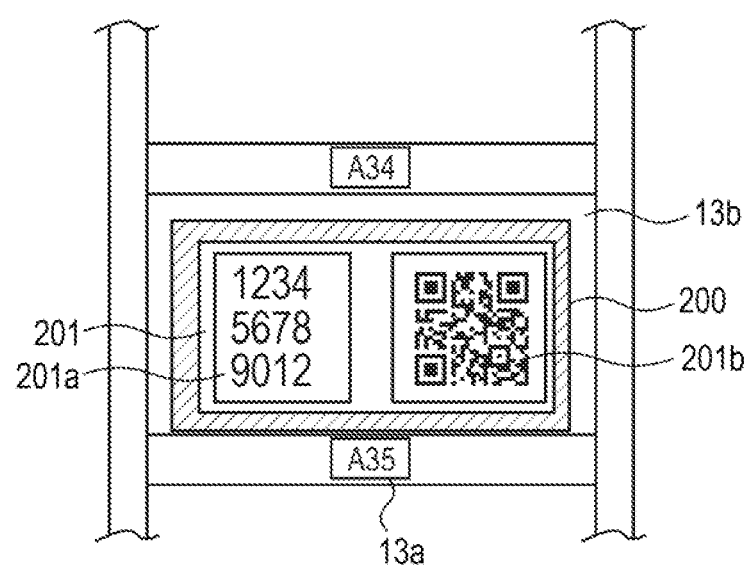
FIG. 6 is an enlarged view in which one compartment of a shelf is enlarged in the first example embodiment.

FIG. 6 is an enlarged view in which one compartment of the shelf 13 is enlarged and illustrates the article 200 accommodated in a compartment on the fifth shelf of the third column of the shelf 13. Each compartment is labeled with a shelf label 13a represented by combination of the column number and the shelf number of the shelf 13. For example, the compartment on the fifth shelf of the third column of the shelf A is labeled with the shelf label 13a in which "A35" is written. Further, it is preferable that a back plate 13b of each compartment of the shelf 13 be painted in black or the like for easier image detection of the article 200.

A voucher 201 used for identifying each article 200 is attached to the side face of the box of each of all the articles 200 arranged in the shelf 13. For the article 200 designated, at the order placement at an EC site, to be picked up at the delivery space (storage room 10), the voucher 201 is attached at the time of dispatch of the article 200. Further, for the article 200 initially designated to be received at home at the time of the order but changed to be picked up at the storage room 10 because of absence of the recipient or the like, the voucher 201 is attached by a distributor worker when the article 200 is stored in the storage room 10. For example, the distributor worker carries a compact printer capable of creating the voucher 201 based on a barcode and is able to cause the printer to read a barcode of the original voucher 201 attached to the article 200 and create the voucher 201 at the site.

As illustrated in FIG. 6, a voucher number 201a and a barcode 201b are printed in the voucher 201. The voucher number 201a is identification information used for distribution management of the article 200 (article identification information) and is made up of a 12-digit number, for example. Any form of the voucher number 201a is employed and may include both a numeral and an alphabet. To reduce erroneous detection in image recognition, the shelf label 13a may be represented by only alphabets, and the voucher number 201a may be represented by only numerals. The barcode 201b is a two-dimensional barcode such as a QR code (registered trademark) recording the voucher number 201a. Note that the name of a destination (recipient), an order number at an EC site, a location code, or the like may be further printed in the voucher 201. Note that the voucher 201 is not limited to a paper medium, and various recording mediums that can be read by the user terminal 21 may be used.

Figures 7, 8:
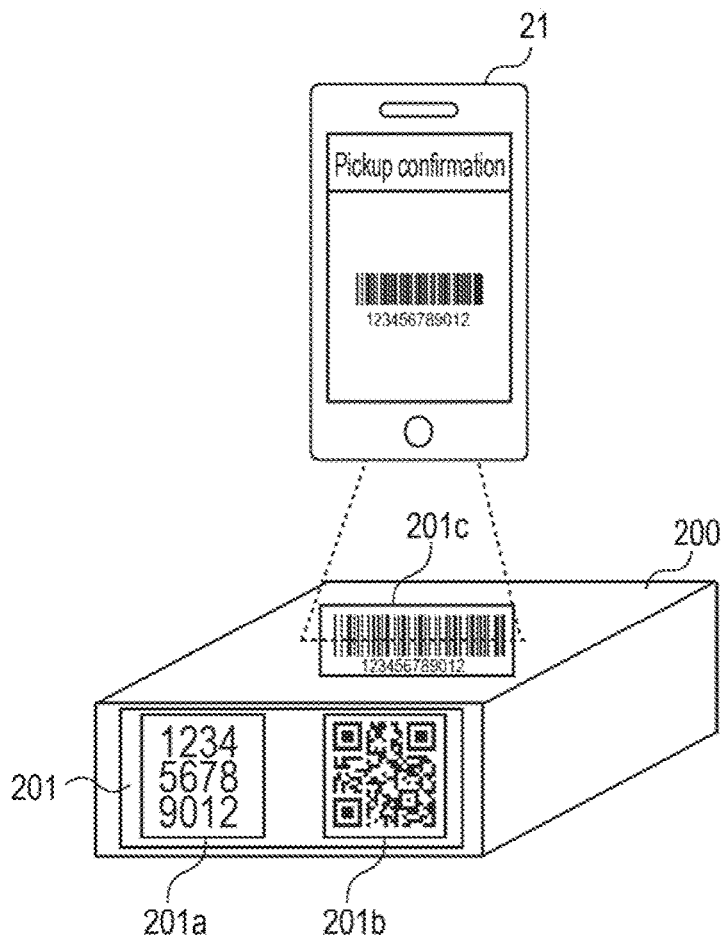
FIG. 7 is a diagram illustrating a method of confirming reception of an article in the first example embodiment.
FIG. 8 is a diagram illustrating an example of management information stored in a management server in the first example embodiment.

FIG. 7 is a diagram illustrating a method of confirming reception of the article 200 in the present example embodiment. As illustrated in FIG. 7, a one-dimensional barcode 201c recording the voucher number 201a is further attached to the top face of the article 200. The barcode 201c is a part of the voucher 201. Note that a two-dimensional barcode may be used as the barcode 201c in the same manner as the barcode 201b. After taking the article 200 out from the shelf 13, the user 20 gets the barcode 201c (or the barcode 201b) read by using the dedicated application in the user terminal 21. At this time, the user terminal 21 transmits the voucher number 201a obtained by reading of the barcode 201c to the edge GW 101 by wireless communication. Accordingly, the edge GW 101 determines whether or not a voucher number of the article 200 from which the barcode 201c has been read and a voucher number associated with a target article of the user 20 are matched. If the two voucher numbers are matched, the edge GW 101 then determines that delivery of a target article is completed and permits the user 20 to exit the room.

Subsequently, information stored respectively in the management server 31 and the edge GW 101 for confirming entry/exit of the user 20 and delivery of the article 200 will be described.

FIG. 8 is a diagram illustrating an example of management information stored by the management server 31 in the present example embodiment. Herein, a user ID, a name, a MAC address, start of an available date and time, end of an available date and time, key information, an enable flag, and the like are indicated as an example as data items of the management information. The data items are not limited to the above and may include a contact address, a voucher number, or the like, for example. The user ID is identification information that is unique to each user 20 of the delivery management system 1. The MAC address is identification information that is unique to each user terminal 21 and used as authentication information on the user 20 in the present example embodiment. The start of an available date and time and the end of an available date and time are dates and times of the start and the end of a period in which the user 20 is able to use the storage room 10 as the distribution destination. The key information is a key number arbitrarily set by the user 20 for the storage room (BOX) 10. The enable flag is a flag that is switched to ON when the user is allowed to enter the storage room 10 by using the key number and switched to OFF when entry is not allowed. For the storage room 10 for which a key number has been set, when the distribution status indicating completion of distribution is notified from the company server 33, the enable flag is turned to ON. When delivery of a target article to the user 20 is then completed, the enable flag is turned back to OFF. Accordingly, entry of the user 20 to the storage room 10 is permitted only when a target article is stored in the storage room 10.

A registration method of a key number corresponding to the storage room 10 may be (A) a method of using the dedicated application to read the keyhole seal 12 (barcode) already attached to the storage room 10 and entering and registering a key number in a state where the user terminal 21 and the edge GW 101 are in wireless connection, (B) a method of logging in a web site managed by the management server 31 from the user terminal 21 or a personal computer and entering and registering identification information on the storage room 10 and a key number, or the like. In the case of the method of (A) described above, there is an advantage that the user 20 can omit entry of a MAC address or identification information on the storage room 10.

Figures 9, 10:
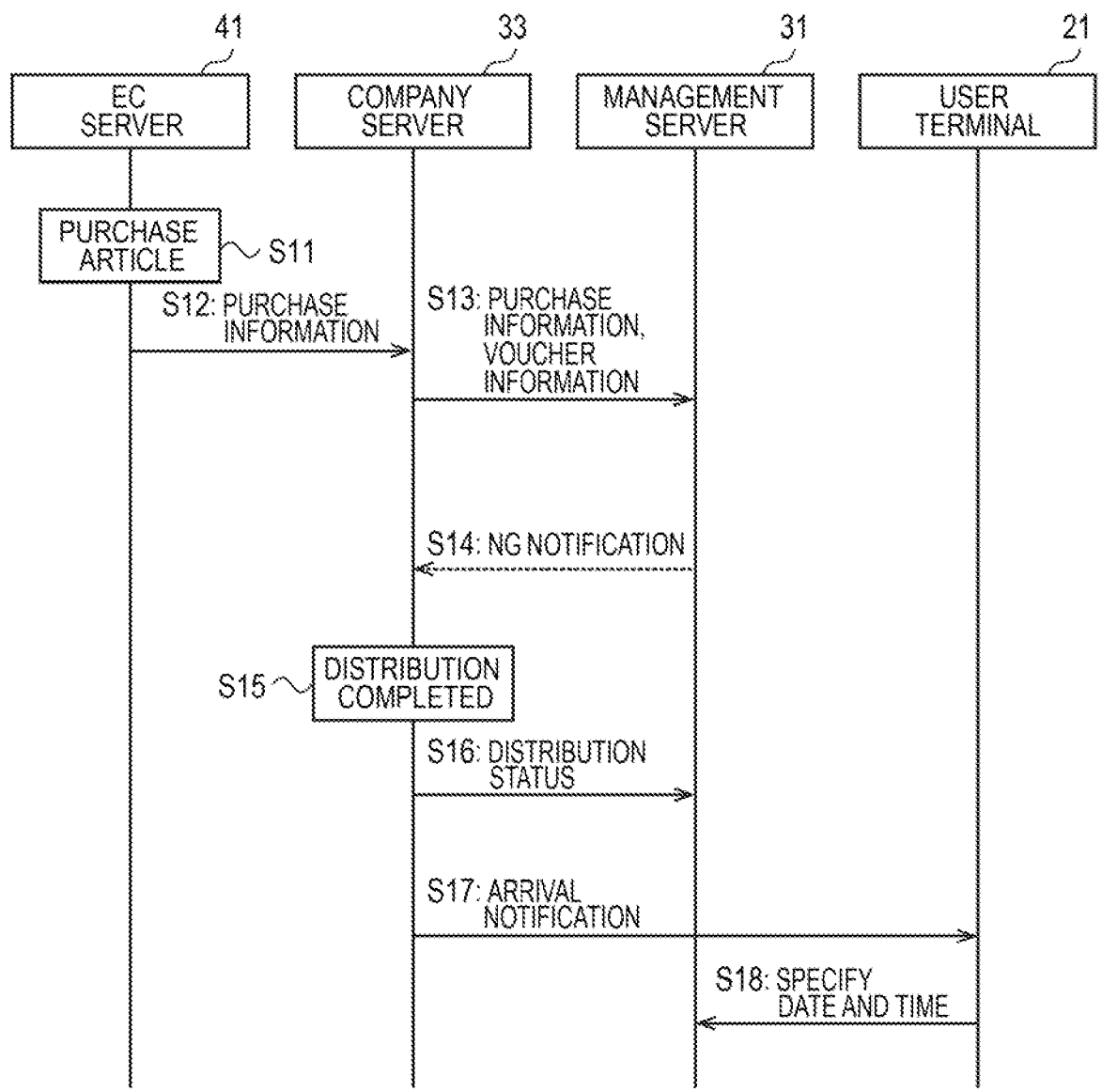
FIG. 9 is a diagram illustrating an example of permission information stored in an edge gateway in the first example embodiment.
FIG. 10 is a sequence chart illustrating an example of an article distribution process in the first example embodiment.

FIG. 9 is a diagram illustrating an example of permission information stored by the edge GW 101 in the present example embodiment. Herein, a MAC address, an available period, an enable flag, a key number, an article position, a voucher number, and the like are indicated as an example as data items of the permission information. The data items are not limited to the above. For example, a date and time when permission information is registered or an error code or a processing date and time when an authentication request is issued from an unregistered user terminal 21 may be included. The MAC address, the key number, and the enable flag are data items common to the management information described above. The available period is a period in which the user 20 can enter (access) the storage room 10. The available period corresponds to a pickup period set by the user 20 by itself, a certain period from the time (for example, 24 hours, 3 days, 1 week, or the like) when the distributor stored the article 200 in the storage room 10, or the like, for example. The article position is a storage position of the article 200 in the storage room 10. The voucher number is identification information used for distribution management of the stored article 200 (article identification information).

Subsequently, an operation in the delivery management system 1 configured as described above will be described with reference to the drawings.

FIG. 10 is a sequence chart illustrating an example of an article distribution process in the present example embodiment. This sequence chart illustrates the process from purchase of the article 200 to completion of preparation for pickup of the article 200. First, the user 20 accesses an EC site, which is managed by an EC server 41, from a personal computer at home, the user terminal 21, or the like and purchases the article 200 at the EC site (step S11). It is assumed that, in the purchase, the storage room 10 is designated by the user 20 as a place where the article 200 is picked up.

The EC server 41 transmits purchase information including information on the purchased article 200, the user 20 who made the purchase, the designated storage room 10, or the like to the company server 33 (step S12). The company server 33 records the purchase information from the EC server 41 in the database 34 and transmits the purchase information together with a voucher number of the article 200 to the management server 31 (step S13). The management server 31 stores the information from the company server 33 in the database 32.

If there is no available compartment in the shelf 13 of the storage room 10, the management server 31 returns an NG notification to the company server 33 (step S14). The company server 33 that has received the NG notification temporarily retains distribution of the article 200 until the shelf 13 of the storage room 10 becomes available. The company server 33 may transmit a mail or the like that requests the user terminal 21 to change a pickup place.

In response to accommodating the article 200 in the shelf 13 of the storage room 10, the distributor worker notifies the company server 33 of distribution completion from the distributor worker terminal or the like. In response to the notification from the distributor worker, the company server 33 confirms that the distribution of the article 200 to the storage room 10 is completed (step S15). In response to confirming the completion of distribution, the company server 33 transmits the distribution status (for example, "distributed") of the article 200 to the management server 31 (step S16).

Figure 11:
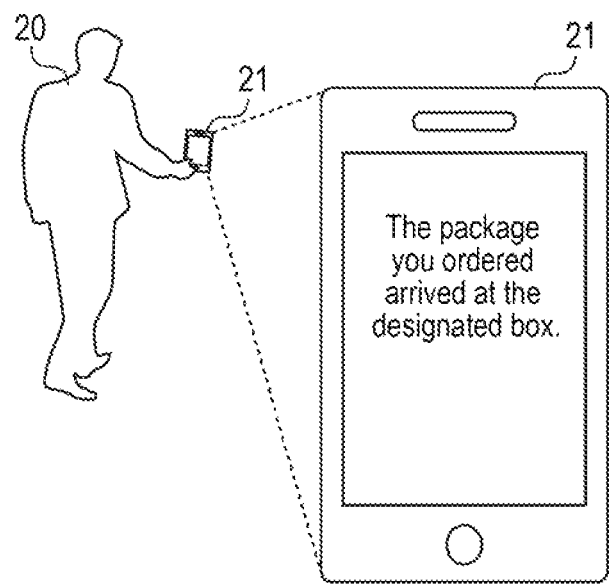
FIG. 11 is a diagram illustrating an example of a window displayed at a user terminal in the first example embodiment.

Furthermore, the company server 33 transmits, to the user terminal 21, an electronic mail (arrival mail) indicating that the article 200 has arrived at the storage room 10 (step S17). FIG. 11 is a diagram illustrating an example of a window displayed on the user terminal 21. Herein, a message "The package you ordered has arrived in the designated box." is displayed on a screen of the user terminal 21.

The user 20 who has received the arrival mail may use the link (not illustrated) written in the arrival mail to access the web site managed by the management server 31 and specify a pickup date and time of the article 200, for example, at the user terminal 21 (step S18). The specifying of a pickup date and time may be omitted.

Figure 12:
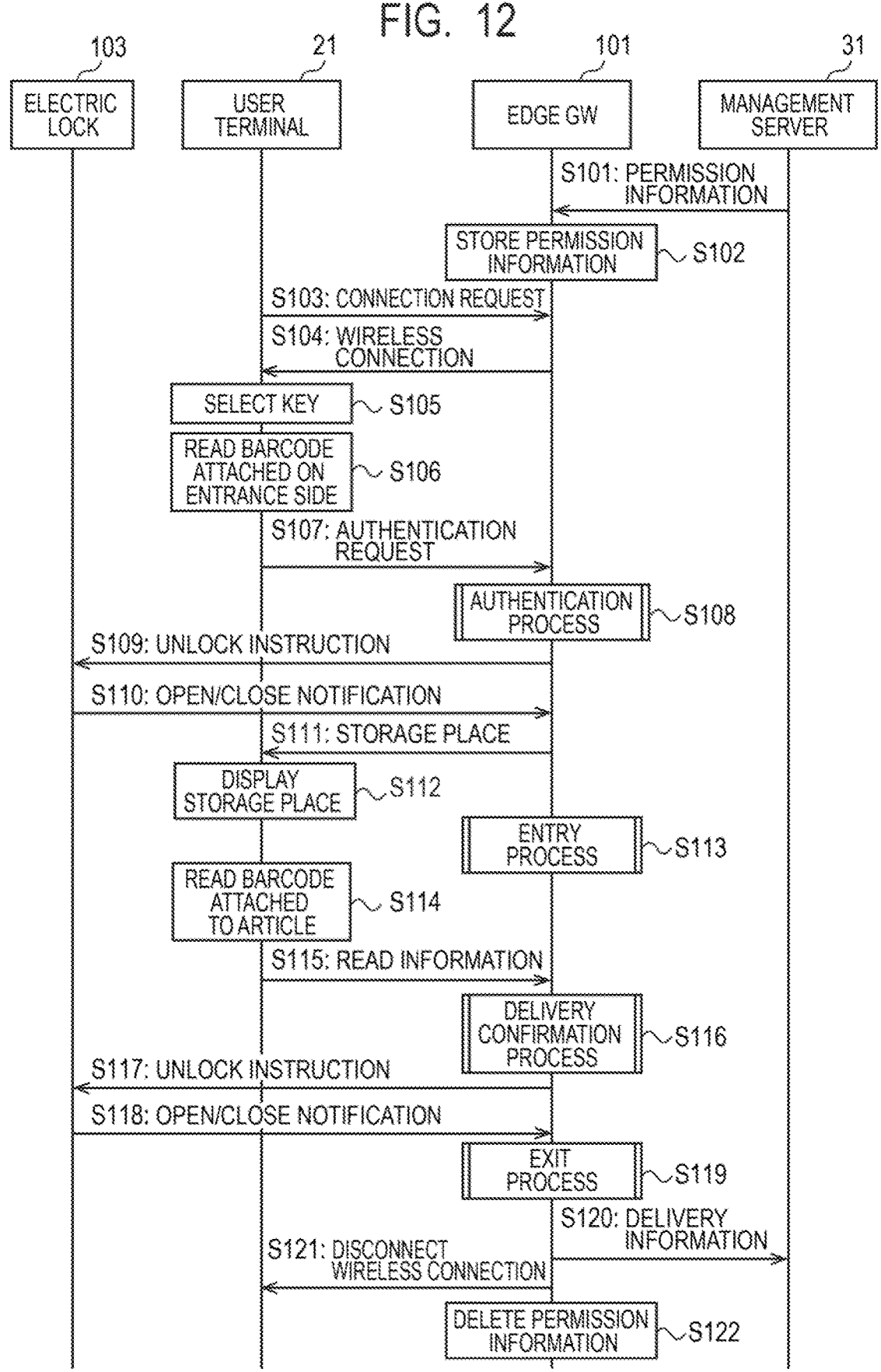
FIG. 12 is a sequence chart illustrating an example of an article delivery process in the first example embodiment.

FIG. 12 is a sequence chart illustrating an example of an article delivery process in the present example embodiment. This sequence chart illustrates the process from completion of preparation for pickup of the article 200 in the storage room 10 to pickup of the article 200 (target article) by the user 20. A case where target articles of different users 20A, 20B, and 20C have been stored in the storage room 10 and the user 20A picks up the target article will be described below as an example. Further, the dedicated application has been installed in advance in the user terminals 21 carried by respective users 20, and key numbers to the storage room 10 have been registered individually by respective users 20. Further, FIG. 13 to FIG. 16 illustrate an example of display windows of the user terminal 21, respectively.

First, the management server 31 transmits, to the edge GW 101, permission information to the users 20A, 20B, and 20C who are recipients of the target articles stored in the storage room 10 (step S101). The permission information includes the MAC address of the user terminal 21, key information, a voucher number, a pickup date and time, or the like, for example. The MAC address is unique identification information (ID) for each user terminal 21. The voucher number is a voucher number of a target article associated with each user 20. The pickup date and time is a date and time specified by the user in step S18 of FIG. 10.

Next, the edge GW 101 stores the permission information on the users 20A, 20B, and 20C received from the management server 31 in the storage device 134 (step S102). That is, the users 20A, 20B, and 20C are registered in the storage device 134 as persons authorized to enter the storage room 10. Note that the process of step S101 and step S102 is performed in a predetermined cycle (for example, at an interval of 15 minutes). Accordingly, the permission information registered in the edge GW 101 is updated to the latest status. For example, when a target article of a user 20D is newly distributed to the storage room 10, the permission information on the user 20D is added and registered to the storage device 134 of the edge GW 101.

When the user 20A who has received the arrival mail (see step S17 of FIG. 10) enters the wireless communication coverage of the edge GW 101 from the storage room 10, the dedicated application of the user terminal 21 issues a connection request to the edge GW 101 (step S103). In response to receiving the connection request from the user terminal 21, the edge GW 101 establishes communication connection to the user terminal 21 by wireless communication (step S104).

Figure 13:
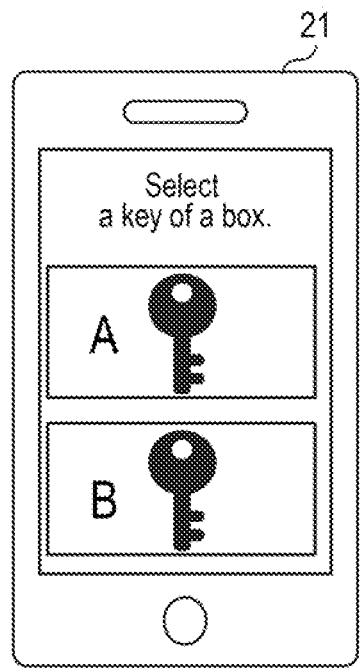
FIG. 13 is a diagram illustrating an example of a window displayed on the user terminal in the first example embodiment.

Next, the user terminal 21 accepts selection of key information made by the user 20A on the screen in a state of being connected to the edge GW 101 (step S105) and then displays a message that prompts the user 20A to get the keyhole seal 12 read. In the example of FIG. 13, two types of keys A and B and a message prompting the user to select a key ("Select a key of a box.") are displayed on the screen of the user terminal 21. Further, in the example of FIG. 14, when the key A has been selected, a message prompting the user to get the keyhole seal 12 read ("Read a keyhole barcode next to the door read.") is displayed.

Figure 15:
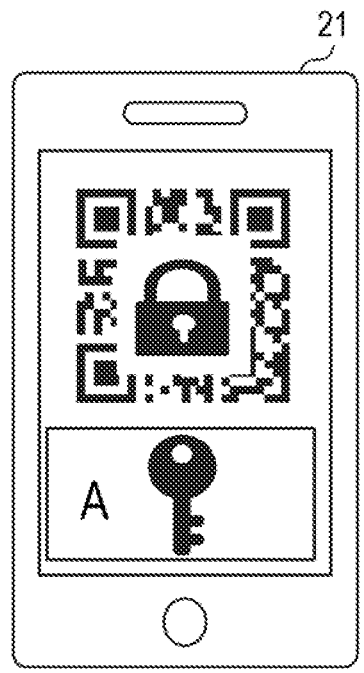
FIG. 15 is a diagram illustrating an example of a window displayed on the user terminal in the first example embodiment.

Next, the user terminal 21 reads a two-dimensional barcode of the keyhole seal 12, which is attached to the entrance side of the storage room 10, in accordance with the operation made by the user 20A (step S106) and then transmits an authentication request to the edge GW 101 in accordance with a startup code recorded in the two-dimensional barcode (step S107). The authentication request includes the selected key information and authentication information including the MAC address of the user terminal 21. In the example of FIG. 15, the read two-dimensional barcode and the selected key are displayed on the screen of the user terminal 21. Such a window is displayed until the authentication process ends, for example. The authentication process in the present example embodiment refers to a process of determining whether or not to permit the user 20 to enter (access) the storage room 10 (control target area).

Next, the edge GW 101 performs an authentication process on the user 20A based on the authentication request received from the user terminal 21 (step S108) and, once authenticating the user 20A, transmits an unlock signal to the electric lock 103 (step S109). Thereby, the electric lock 103 is unlocked, and the door 11 is ready to be opened and closed. Note that, if neither opening nor closure of the door 11 is detected for a certain period (for example, 5 seconds), the electric lock 103 is automatically locked. Also if the electric lock 103 is locked before the user 20A enters the room, it is possible for the user 20A to be re-authenticated by using the user terminal 21 to perform key selection and image reading again. Furthermore, if the authentication of the user 20A is permitted, it is preferable to allow a companion of the user 20A to enter the room at the same time.

Once the user 20A opens the door 11, the electric lock 103 detects opening and closure of the door 11 and transmits an open/close notification to the edge GW 101 (step S110). Further, the open/close detection may be performed by an open/close sensor provided to the door 11.

Figure 16:
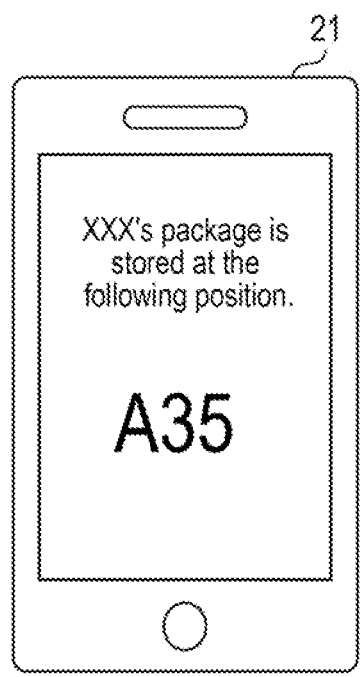
FIG. 16 is a diagram illustrating an example of a window displayed on the user terminal in the first example embodiment.

Next, in response to authenticating the user 20A, the edge GW 101 extracts a storage place of the target article by searching for shelf allocation data stored in the storage device 134 by using the MAC address as a key and notifies the user terminal 21 of the extracted storage place (step S111). The user terminal 21 displays information on the storage place received from the edge GW 101 on the screen (step S112). In the example of FIG. 16, a message for guidance of the storage position of the target article ("XXX's package is stored at the following position. A35") is displayed on the screen of the user terminal 21.

Next, the edge GW 101 performs an entry process (step S113). On the other hand, the user terminal 21 reads the barcode 201c written in the voucher 201 of the article 200 as illustrated in FIG. 7 in accordance with the operation performed by the user 20A who has entered the room (step S114) and then transmits read information to the edge GW 101 (step S115). The read information includes the voucher number of the article on reading and the MAC address of the user terminal 21 that has performed the reading, for example.

Next, the edge GW 101 performs a delivery confirmation process for the target article based on the received read information (step S116). In response to confirming delivery of the target article to the user 20A, the edge GW 101 permits the user 20A to exit the room. Specifically, the edge GW 101 sets the exit button 102 to an available state (active state).

Next, in response to detecting pressing of the exit button 102 in an active state, the edge GW 101 transmits an unlock signal to the electric lock 103 (step S117). Thereby, the electric lock 103 is unlocked, and the door 11 is ready to be opened and closed. If neither opening nor closure of the door 11 is detected for a certain period (for example, 5 seconds), the electric lock 103 is automatically locked. If the electric lock 103 is locked before the user 20A exits the room, it is possible for the user 20A to exit the room by pressing the exit button 102 again.

The user 20A opens the door 11, and the electric lock 103 then detects opening and closure of the door 11 and transmits an open/close notification to the edge GW 101 (step S118). In response to receiving the open/close notification about the door 11, the edge GW 101 performs an exit process (step S119).

Next, the edge GW 101 transmits, to the management server 31, delivery information on the target article related to the user 20A who has exited the room (step S120). The delivery information includes a voucher number of a target article and the MAC address of the user terminal 21, for example. In response to receiving the delivery information, the management server 31 updates the management information. Specifically, the status associated with the voucher number is updated to "delivered", and the enable flag is updated to "OFF".

The edge GW 101 then disconnects the wireless connection from the user terminal 21 (step S121) and deletes the permission information related to the user terminal 21, which was connected, from the storage device 134 (step S122). Note that, while the record may be deleted on a MAC address basis from the database 32, the enable flag associated to the MAC address may be updated to "OFF". Further, the key information associated with the MAC address may be deleted. In any cases, the edge GW 101 can restrict re-entry after the user 20A has exited the room.

Figure 17:
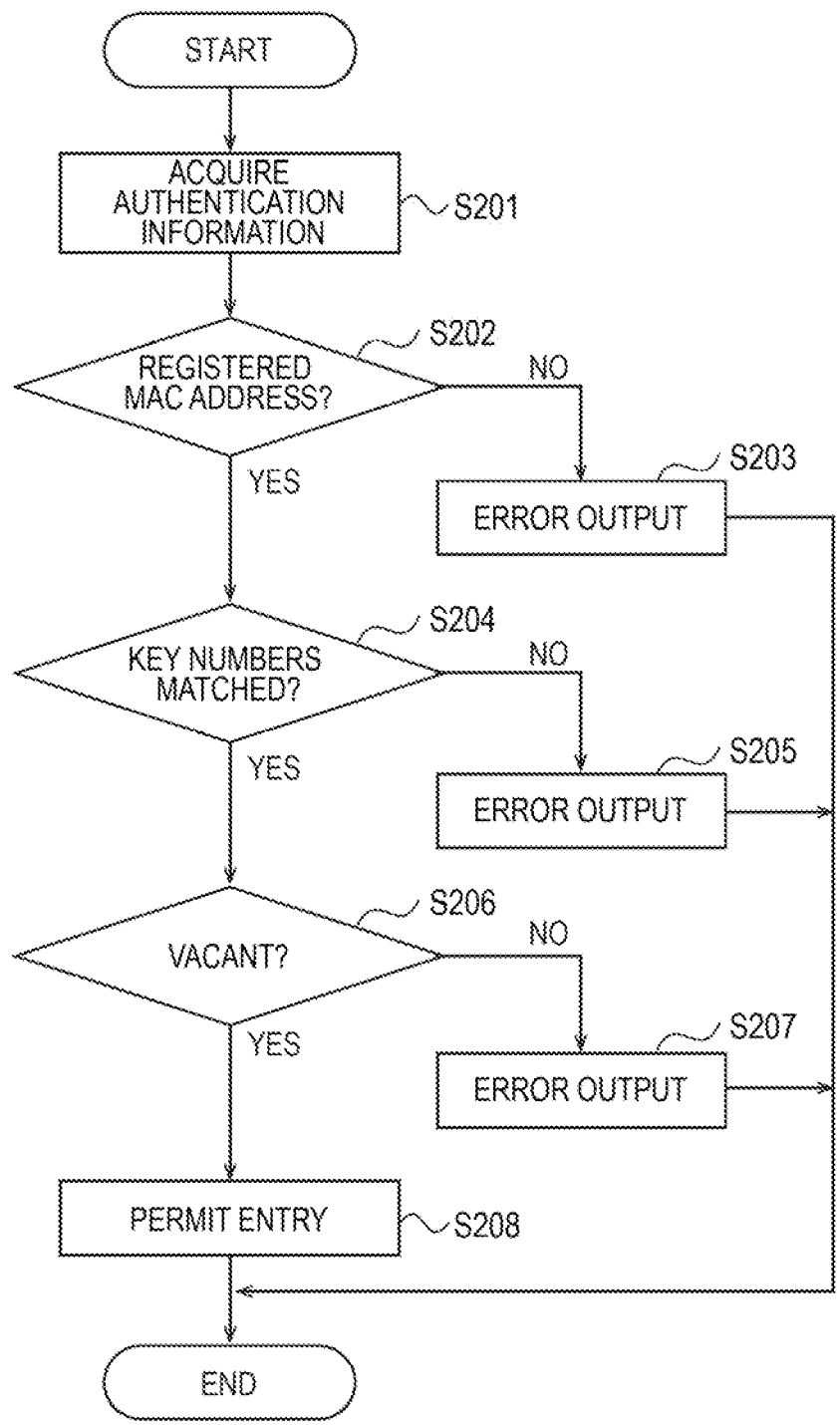
FIG. 17 is a flowchart illustrating an example of an authentication process in the first example embodiment.

FIG. 17 is a flowchart illustrating an example of an authentication process in the present example embodiment. This process represents the details of step S108 of FIG. 12. First, the edge GW 101 acquires the authentication information transmitted from the user terminal 21 (step S201) and then determines whether or not the MAC address included in the authentication information and the MAC address registered as the permission information are matched each other (step S202). Herein, if the edge GW 101 determines that the MAC addresses are matched (step S202: YES), the process proceeds to step S204.

In contrast, if the edge GW 101 determines that the MAC addresses are not matched (step S202: NO), the edge GW 101 outputs error information to the user terminal 21 (step S203) and ends the process. An example of the error information in step S203 may be a message such as "Your package is not stored in the box.", for example.

In step S204, the edge GW 101 determines whether or not the key number included in the authentication information and the key number in the storage device 134 are matched each other. Herein, if the edge GW 101 determines that the key numbers are matched (step S204: YES), the process proceeds to step S206. In contrast, if the edge GW 101 determines that the key numbers are not matched (step S204: NO), the edge GW 101 outputs error information to the user terminal 21 (step S205) and ends the process. An example of the error information in step S205 may be a message such as "Key numbers are not matched.", "Key is invalid.", or the like, for example.

In step S206, the edge GW 101 determines whether or not the storage room 10 is vacant based on information or the like from the live camera 105. Herein, if the edge GW 101 determines that the storage room 10 is vacant (step S206: YES), the process proceeds to step S208. In contrast, if the edge GW 101 determines that the storage room 10 is not vacant (step S206: NO), the edge GW 101 outputs error information to the user terminal 21 (step S207) and ends the process. That is, when a certain user 20 is present in the room, entry of another user 20 to the room is refused. An example of the error information in step S207 may be a message such as "The storage room is currently occupied. Please wait for a while." or the like, for example. Note that the edge GW 101 may perform control not to display a barcode reading window on the user terminal 21 instead of error output of step S207. Similarly, the edge GW 101 may instruct the user terminal 21 to display a message such as "The room is occupied. No barcode reading is available." or the like.

In step S208, the edge GW 101 permits the user 20A carrying the user terminal 21 to enter the room and ends the process. This enables the edge GW 101 to output an unlock signal to the electric lock 103.

Figure 18:
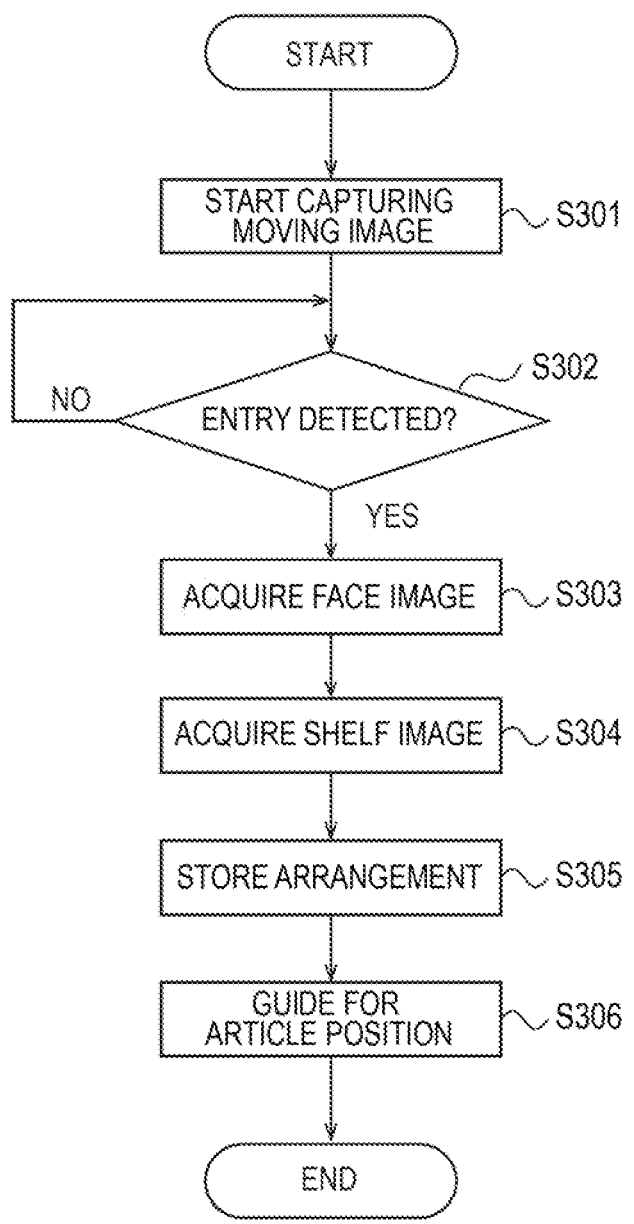
FIG. 18 is a flowchart illustrating an example of an entry process in the first example embodiment.

FIG. 18 is a flowchart illustrating an example of an entry process in the present example embodiment. This process illustrates the details of step S113 of FIG. 12. First, the edge GW 101 starts capturing a moving image by using the live camera 105 (step S301) and determines whether or not entry of the user 20A to the room is detected (step S302). For example, the edge GW 101 performs motion detection by analyzing image data from the live camera 105. The live camera 105 may have a function of motion detection. Further, a human-detection sensor or the like may be provided inside the storage room 10. Note that, without being limited to a moving image, the edge GW 101 may acquire static images captured at predetermined intervals from the live camera 105.

If no entry to the room is detected (step S302: NO), the edge GW 101 stands by until entry to the room is detected. If entry to the room is detected (step S302: YES), the edge GW 101 uses the live camera 105 to acquire a face image of the user 20A who has entered the room (step S303) and uses the shelf camera 106 to acquire a shelf image (step S304). Herein, the acquired shelf image is an image of the shelf 13 immediately after the user 20A has entered the storage room 10, which indicates the state before the article 200 arranged on the shelf 13 is taken out by the user 20A. The process from step S301 to step S304 is not necessarily performed sequentially and may be performed in parallel.

Next, the edge GW 101 stores the arrangement of all the articles 200 accommodated in the shelf 13 based on the shelf image (step S305). For example, the edge GW 101 reads information of the voucher 201 and the shelf label 13a by using an image recognition technology such as Optical Character Recognition (OCR) and stores the voucher number of the article 200 in the storage device 134 in association with the shelf label 13a. That is, a list of the articles 200 accommodated in the shelf 13 (shelf allocation data) is created.

Next, the edge GW 101 guides the user 20A who has entered the room for the position of the article 200 (step S306). For example, the edge GW 101 makes announcement such as "Your package is on the second shelf of the first column of shelf A. See the screen for details." by using the audio terminal 108 and displays the layout of the shelf 13 and the position of the article 200 by using the display 109. The user 20A confirms the position of the article 200 displayed on the display 109 in accordance with voice guidance. The user 20A then moves to the front of the shelf 13 and takes the article 200 out of the shelf 13. Note that, since the edge GW 101 guides the user terminal 21 for the article position after completion of the authentication process (see step S112 of FIG. 12), the process of step S306 may be omitted.

Figure 19:
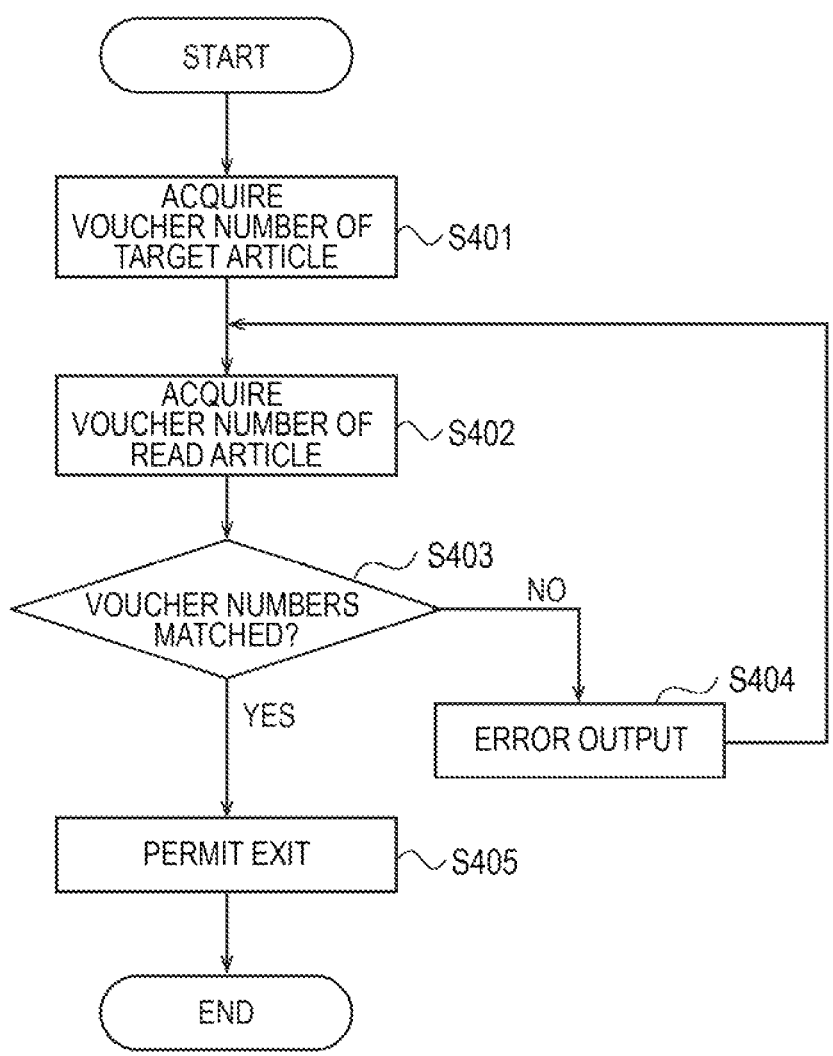
FIG. 19 is flowchart illustrating an example of a pickup confirmation process in the first example embodiment.

FIG. 19 is a flowchart illustrating an example of a delivery confirmation process in the present example embodiment. This process represents the details of step S116 of FIG. 12 and is performed when the user terminal 21 reads the barcode 201c of the voucher 201 attached to the article 200.

First, the edge GW 101 acquires a voucher number of the target article from the storage device 134 based on the MAC address of the user terminal 21 of the user 20A who has entered the room (step S401) and acquires a voucher number of the article on the reading from the read information (step S402).

Next, the edge GW 101 determines whether or not the two acquired voucher numbers are matched each other (step S403). Herein, if the edge GW 101 determines that the voucher numbers are matched (step S403: YES), the edge GW 101 permits the user 20A to exit the room (step S405) and ends the process. In contrast, if the edge GW 101 determines that the voucher numbers are not matched (step S403: NO), the edge GW 101 outputs error information to the user terminal 21 or the audio terminal 108 (step S404), and the process returns to step S402.

An example of the error information in step S404 may be a message such as "Please check the contents of the voucher. It is not your package.", "Your package is on the second shelf of the first column of shelf A. See the screen for details.", or the like.

Figure 20:
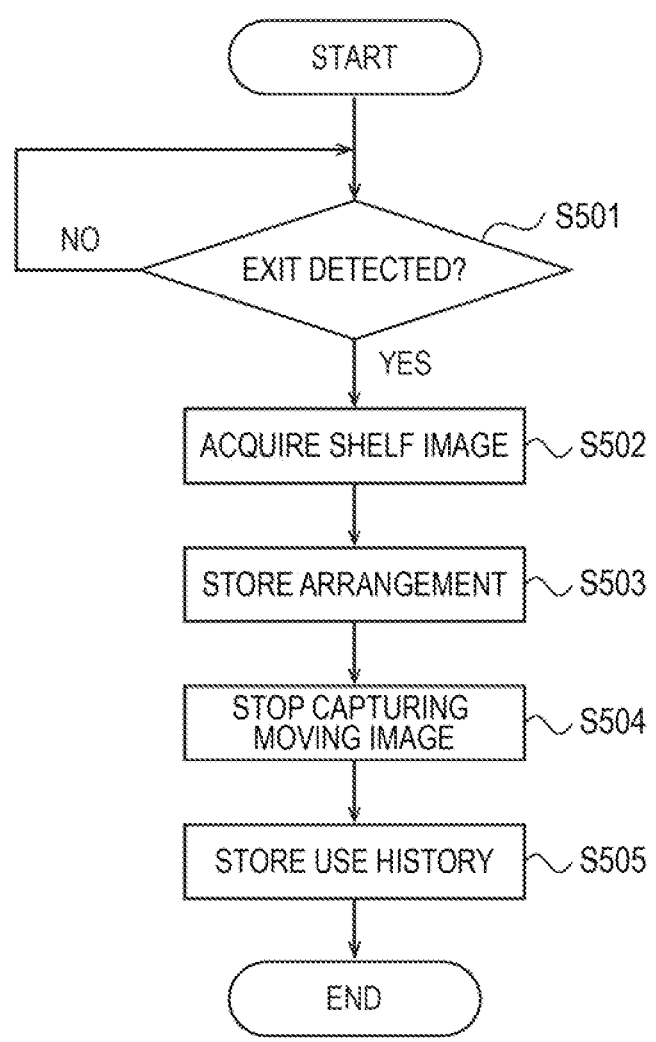
FIG. 20 is a flowchart illustrating an example of an exit process in the first example embodiment.

FIG. 20 is a flowchart illustrating an example of an exit process in the present example embodiment. This process represents the details of step S119 of FIG. 12. First, the edge GW 101 determines whether or not exit of the user 20A from the room is detected by using the live camera 105 (step S501). If exit from the room is not detected (step S501: NO), the edge GW 101 stands by until exit from the room is detected.

Next, if exit of the user 20A from the room is detected (step S501: YES), the edge GW 101 acquires a shelf image of the shelf 13 by using the shelf camera 106 (step S502). Herein, the acquired shelf image is an image of the shelf 13 captured immediately after the user 20A has exited the storage room 10, which indicates the state after the article 200 arranged on the shelf 13 has been taken out by the user 20A.

Next, the edge GW 101 stores the arrangement of all the articles 200 accommodated on the shelf 13 based on the shelf image (step S503). The edge GW 101 reads information of the voucher 201 and the shelf label 13a and stores the information of the voucher 201 of the article 200 in the storage device 134 in association with the shelf label 13a. Further, the edge GW 101 stops capturing a moving image performed by the live camera 105 (step S504).

Finally, the edge GW 101 stores a use history of the user 20A in the storage device 134 (step S505). The use history includes the MAC address of the user terminal 21 carried by the user 20A or entry/exit time information, for example. Furthermore, the edge GW 101 stores data of a face image of the user 20A, a shelf image at entry/exit, the article arrangement on the shelf 13 acquired from the shelf image, a moving image from the time of entry to the time of exit, or the like in the storage device 134. The moving image is stored as a file on a unit of one minute, for example. Furthermore, the edge GW 101 transmits data of a use history, a face image, the article arrangement, a moving image, or the like stored in the storage device 134 to the management server 31. Such data may be transmitted to the management server 31 in response to a request from the management server 31.

As described above, according to the present example embodiment, the user terminal 21 reads the barcode of the keyhole seal 12 near the entrance of the storage room 10, and the edge GW 101 then receives an authentication request including terminal identification information (MAC address) from the user terminal 21 in a state where wireless communication connection between the edge GW 101 and the user terminal 21 is established. Since the wireless communication connection is established, the edge GW 101 can readily determine whether or not to permit the user 20 carrying the user terminal 21 to enter (access) the storage room 10 based on the received terminal identification information. Accordingly, it is possible to shorten the required time from the time the user terminal 21 transmits an authentication request to the edge GW 101 to the time the edge GW 101 unlocks the electric lock 103 and ensure security in access control of the storage room (control target area) 10.

Further, according to the present example embodiment, the edge GW 101 permits entry to the storage room 10 provided that the user 20 is the recipient of the article 200 stored inside the storage room 10. Thus, even when the person is the user 20 whose key information and terminal identification information are registered in the management server 31, the edge GW 101 can restrict entry to the storage room 10 attempted by a person when no target article of the person is stored in the storage room 10.

Further, according to the present example embodiment, when the user 20 is present in the locked storage room 10, since the edge GW 101 refuses authentication (does not allow entry) of the user 20 even when the permission information (terminal identification information) thereon is registered in the storage device 134, it is possible to individually control entry to and exit from the storage room 10.

Further, according to the present example embodiment, when the user 20 takes an article out of the shelf 13 of the storage room 10 and if a voucher number (identification information) of the article 200 from which the voucher has been read and a voucher number of a target article associated with the user terminal 21 are matched each other, the user 20 is permitted to exit the storage room 10. Accordingly, it is possible to suppress the user 20 from taking a wrong article 200 out of the storage room 10 thus manage delivery of the article 200 in an unattended manner.

Further, the conventional delivery box requires a locking mechanism to be provided for each box that accommodates an article and thus is expensive. In contrast, according to the present example embodiment, since only a single locking mechanism is required for the storage room 10 in which many articles 200 may be stored, it is possible to configure a relatively less expensive system. Further, since the storage room 10 can be installed outside a shop, it is possible to avoid a reduction in a sales floor space. Further, unlike the delivery box, the article 200 can be accommodated in a simple shelf 13, and it is therefore possible to efficiently store many articles 200.

Further, according to the present example embodiment, since authentication is performed using the user terminal 21 carried by the user 20, the keyhole seal 12, and the edge GW 101, it is no longer required to install a card reader apparatus that reads an IC card used for authentication at the entrance as seen in the conventional configuration, and it is possible to reduce the cost for construction and operation of the facility. Further, the user 20 is no longer required to carry an IC card used for authentication and is able to enter and exit the storage room 10 by using only the user terminal 21.

Further, since a two-dimensional barcode printed in the keyhole seal 12 of the present example embodiment does not include identification information on the storage room 10, the same keyhole seal 12 can be similarly attached to a different storage room 10. It is therefore possible to avoid wrong attachment of the keyhole seal 12 that would be caused by a worker, and it is possible to reduce the manufacturing cost of the keyhole seal 12. Further, because of the common seal, there is an advantage of easier replacement of the keyhole seal 12 when the keyhole seal 12 is broken.

Furthermore, in the authentication process of the present example embodiment, since authentication is performed by matching key information selected by the user terminal 21 and terminal identification information on the user terminal 21 with key information (key number) and terminal identification information registered by the user 20 in the management server 31, respectively, the security level can be improved.

Second Example Embodiment

An access control system in a second example embodiment will be described below. The present example embodiment differs from the first example embodiment in that a target article of the user 20 is not required to be stored inside the control target area and that no key information is used. The control target area in the present example embodiment may be not only an indoor area such as a guest room in a hotel, a laboratory in a company, a factory, and the like but also an outdoor facility such as a theme park, for example. Further, while the hardware configuration of the present example embodiment is common to that of the first example embodiment, a control method for entry to and exit from a room (entry to and exit from a facility) is partially different. Specifically, the process such as the delivery confirmation process for the article 200, the notification process for a guidance mail of the article position, the analysis process of the article position based on a shelf image, and the like in the first example embodiment will be omitted. The operation of the access control system in the present example embodiment will be described below.

Figure 21:
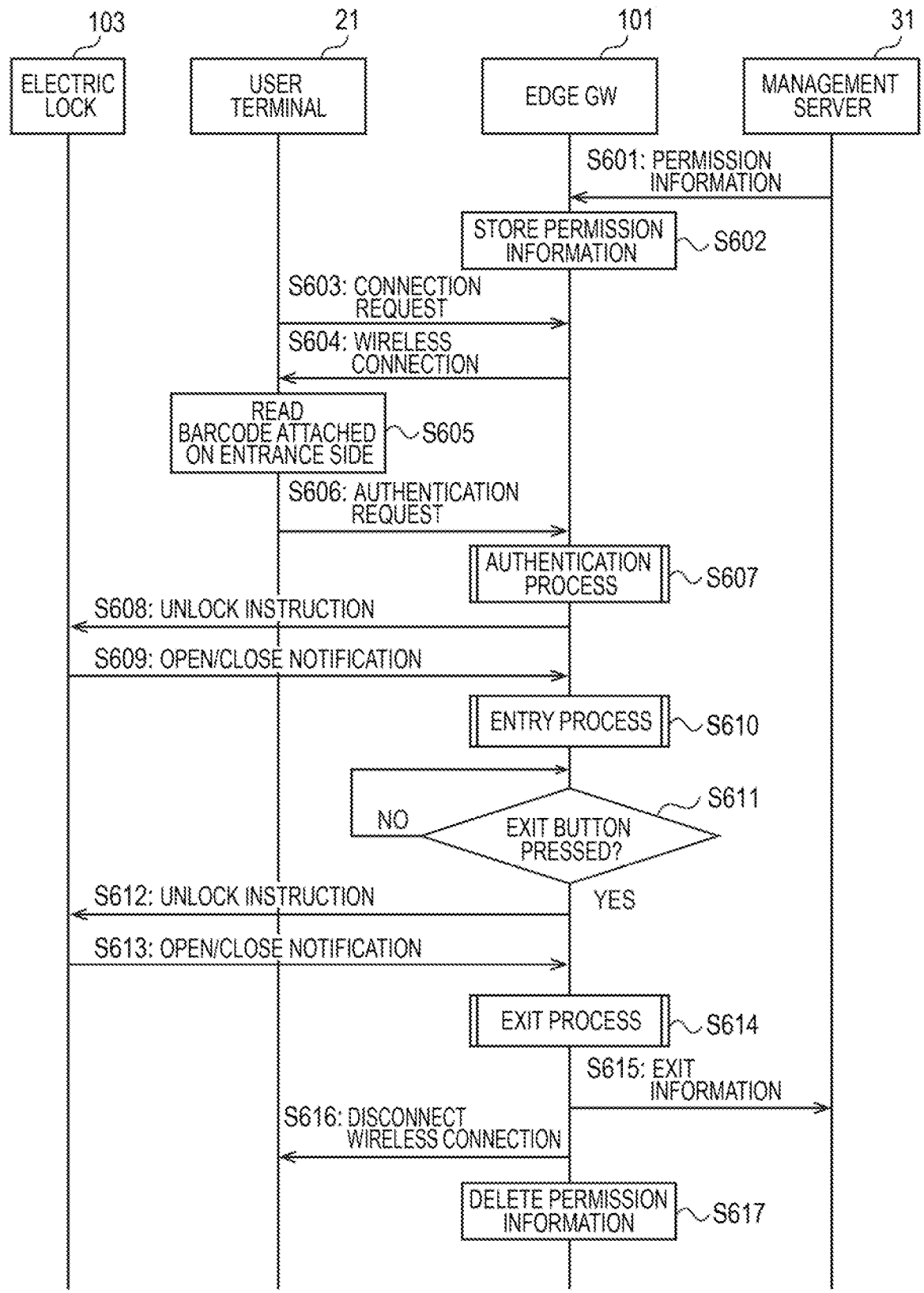
FIG. 21 is a sequence chart illustrating an example of a control process for entry and exit in a second example embodiment.

FIG. 21 is a sequence chart illustrating an example of a control process for entry and exit in the present example embodiment. Herein, a case where the user 20A enters and exits a control target area will be described as an example. Further, the dedicated application has been installed in advance in the user terminal 21 carried by the user 20A.

First, the management server 31 transmits, to the edge GW 101, permission information for the users 20A, 20B, and 20C to be permitted to enter the control target area (step S601). The permission information includes the MAC address of the user terminal 21, an available date and time of a facility that is the control target area, or the like, for example.

Next, the edge GW 101 stores the permission information on the users 20A, 20B, and 20C received from the management server 31 in the storage device 134 (step S602). Note that the process of step S601 to step S602 is performed in a predetermined cycle (for example, at an interval of 15 minutes). Accordingly, the permission information registered in the edge GW 101 is updated to the latest status.

When the user 20A enters the wireless communication coverage of the edge GW 101 from the control target area, the dedicated application in the user terminal 21 issues a connection request to the edge GW 101 (step S603). In response to receiving the connection request from the user terminal 21, the edge GW 101 establishes communication connection to the user terminal 21 by wireless communication (step S604).

Next, the user terminal 21 reads the two-dimensional barcode of the keyhole seal 12 in response to the operation performed by the user 20A in accordance with guidance displayed on the screen (step S605) and then transmits an authentication request to the edge GW 101 in accordance with a startup code recorded in the two-dimensional barcode (step S606). The authentication request includes authentication information including the MAC address of the user terminal 21.

Next, the edge GW 101 performs an authentication process on the user 20A based on the authentication request received from the user terminal 21 (step S607). After the authentication of the user 20A, the edge GW 101 transmits an unlock signal to the electric lock 103 (step S608). This causes the electric lock 103 to be unlocked and enable the door 11 to be opened and closed. Note that, if neither opening nor closure of the door 11 is detected for a certain period (for example, 5 seconds), the electric lock 103 is automatically locked. Also if the electric lock 103 is locked before the user 20A enters the room, it is possible for the user 20A to be re-authenticated by using the user terminal 21 to perform barcode reading of the keyhole seal 12 again.

Once the user 20A opens the door 11, the electric lock 103 detects opening and closure of the door 11 and transmits an open/close notification to the edge GW 101 (step S609). Further, the open/close detection may be performed by an open/close sensor provided to the door 11.

Next, the edge GW 101 performs an entry process (step S610, see FIG. 18). If pressing of the exit button 102 by the user 20A present in the room is not detected (step S611: NO), the edge GW 101 stands by until pressing of the exit button 102 is detected. If the edge GW 101 detects pressing of the exit button 102 (step S611: YES), the edge GW 101 then transmits an unlock signal to the electric lock 103 (step S612). Thereby, the electric lock 103 is unlocked, and the door 11 is ready to be opened and closed. If neither opening nor closure of the door 11 is detected for a certain period (for example, 5 seconds), the electric lock 103 is automatically locked. If the electric lock 103 is locked before the user 20A exits the room, it is possible for the user 20A to exit the room by pressing the exit button 102 again.

The user 20A opens the door 11, and the electric lock 103 then detects opening and closure of the door 11 and transmits an open/close notification to the edge GW 101 (step S613). In response to receiving the open/close notification about the door 11, the edge GW 101 performs an exit process (step S614, see FIG. 20).

Next, the edge GW 101 transmits, to the management server 31, exit information related to the user 20A who has exited the room (step S615). The exit information includes the MAC address of the user terminal 21 or entry/exit time information, for example. In response to receiving the exit information, the management server 31 updates the management information in the database 32.

The edge GW 101 then disconnects the wireless connection from the user terminal 21 (step S616) and deletes the permission information related to the user terminal 21, which was connected, from the storage device 134 (step S617). Note that, while the record may be deleted on a MAC address basis from the database 32, the enable flag associated to the MAC address may be updated to "OFF". Further, the key information associated with the MAC address may be deleted. In any cases, the edge GW 101 can restrict re-entry after the user 20A has exited the room.

Figure 22:
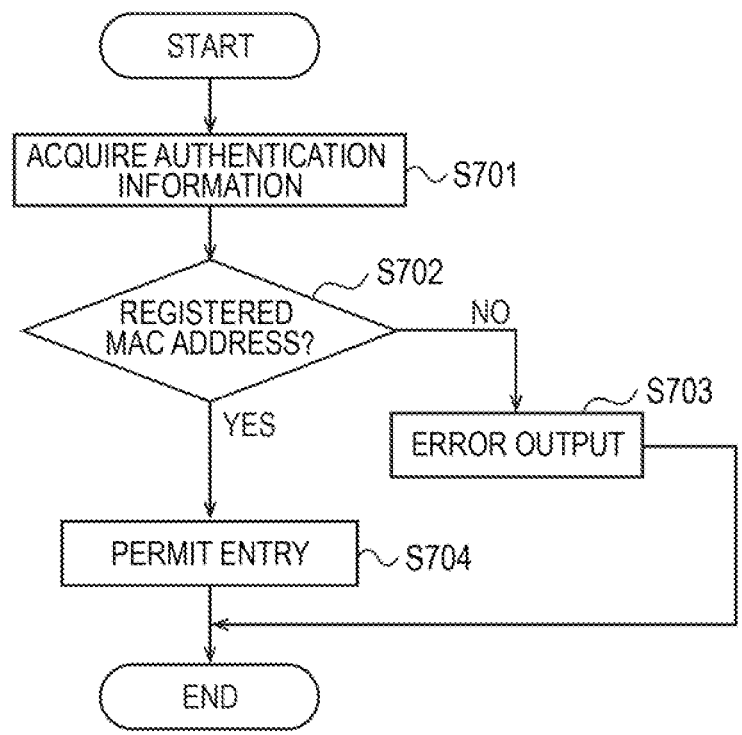
FIG. 22 is a flowchart illustrating an example of an authentication process in the second example embodiment.

FIG. 22 is a flowchart illustrating an example of an authentication process in the present example embodiment. This process represents the details of step S607 of FIG. 21. First, the edge GW 101 acquires authentication information transmitted from the user terminal 21 (step S701) and then determines whether or not the MAC address included in the authentication information and the MAC address registered as the permission information are matched each other (step S702). Herein, if the edge GW 101 determines that the two MAC addresses are matched (step S702: YES), the process proceeds to step S704.

In contrast, if the edge GW 101 determines that the MAC addresses are not matched (step S702: NO), the edge GW 101 outputs error information to the user terminal 21 (step S703) and ends the process. An example of the error information in step S703 may be a message such as "Your terminal is not registered.", for example.

In step S704, the edge GW 101 permits the user 20A carrying the user terminal 21 to enter the room and ends the process. This enables the edge GW 101 to output an unlock signal to the electric lock 103.

As described above, according to the present example embodiment, entry of the user 20 to a control target area can be controlled based on wireless communication between the user terminal 21 carried by the user 20 and the edge GW 101 in the same manner as in the first example embodiment.

Third Example Embodiment

The delivery management system 1 in a third example embodiment will be described below. The present example embodiment further has a function of outputting alert information based on a staying time period of the user 20 inside the storage room 10, which makes a difference from the first example embodiment. The operation of the delivery management system 1 in the present example embodiment will be described below.

Figure 23:
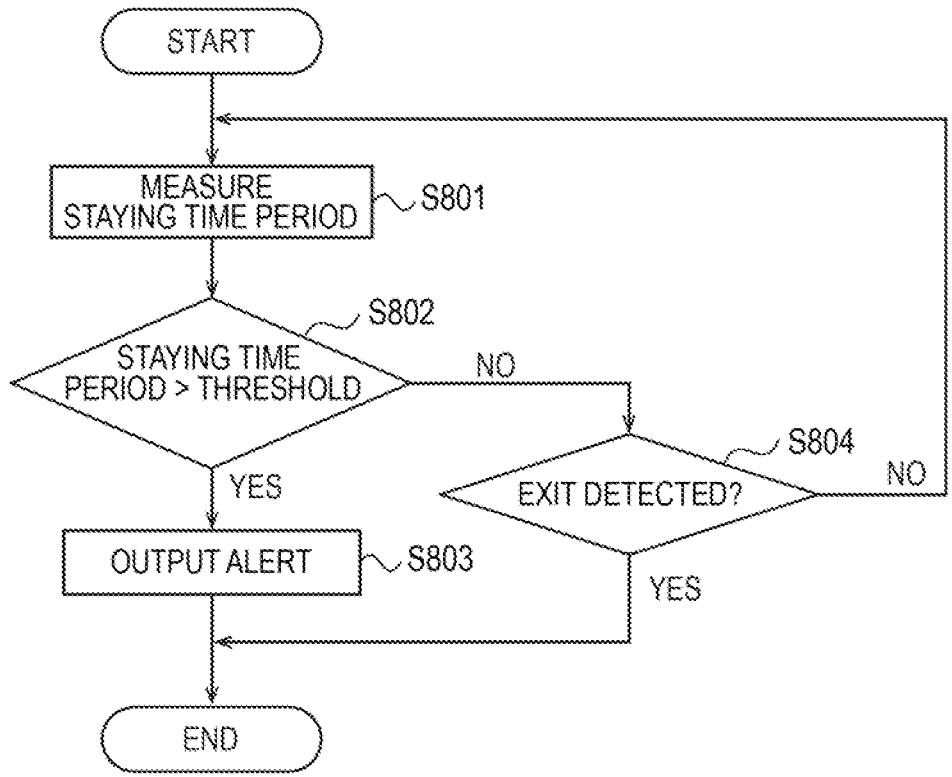
FIG. 23 is a flowchart illustrating an example of a monitor process in a third example embodiment.

FIG. 23 is a flowchart illustrating an example of a monitoring process in the present example embodiment. This process is performed when entry of the user 20 to the room is detected.

First, the edge GW 101 measures the staying time period that the user 20 stays in the storage room 10 (step S801) and determines whether or not the staying time period exceeds a predetermined threshold (for example, 5 minutes) (step S802). Herein, if the edge GW 101 determines that the staying time period exceeds the predetermined threshold (step S802: YES), the edge GW 101 outputs an alert to the user terminal 21, the audio terminal 108, the display 109, the management server 31, and the like (step S803). In contrast, if the edge GW 101 determines that the staying time period is less than or equal to the predetermined threshold (step S802: NO), the process proceeds to step S804.

In step S804, the edge GW 101 determines whether or not exit of the user 20 from the room is detected. Herein, if the edge GW 101 detects exit of the user 20 from the room (step S804: YES), the process ends. In contrast, if the edge GW 101 does not detect exit of the user 20 from the room (step S804: NO), the process returns to step S801.

As described above, according to the delivery management system 1 in the present example embodiment, the edge GW 101 detects a state where the user 20 has stayed in the storage room 10 over a predetermined time period and outputs alert information. Thus, the edge GW 101 can suitably manage the staying time period of the user 20 inside the storage room 10 and thereby can suppress an unauthorized activity and early detect an anomaly in the storage room 10.

Fourth Example Embodiment

The delivery management system 1 in a fourth example embodiment will be described below. The present example embodiment differs from the first example embodiment in the order of process steps in the article delivery process. The operation of the delivery management system 1 in the present example embodiment will be described below.

Figure 24:
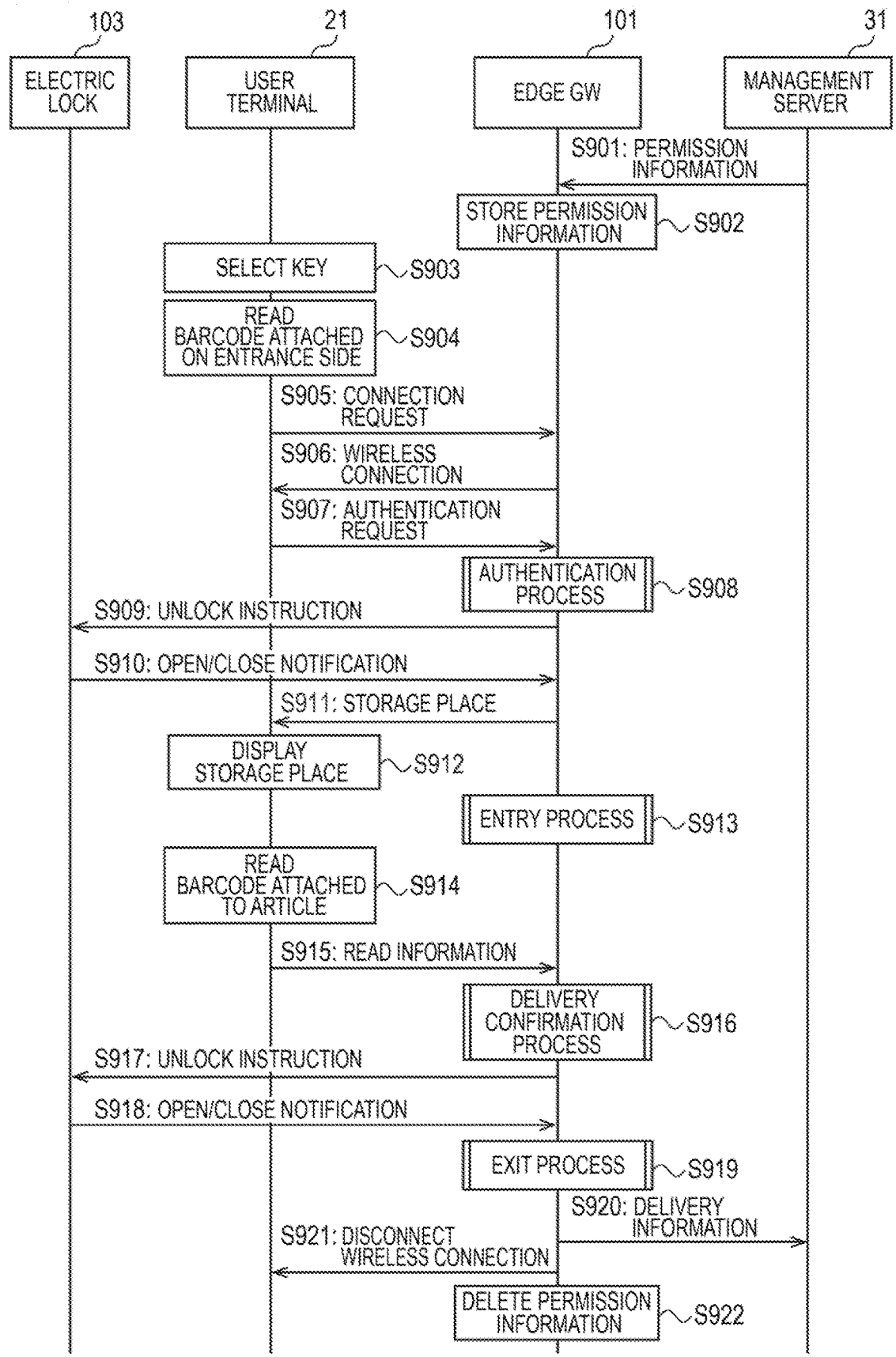
FIG. 24 is a sequence chart illustrating an example of an article delivery process in a fourth example embodiment.

FIG. 24 is a sequence chart illustrating an example of the article delivery process in the present example embodiment. This sequence chart represents the process from completion of preparation for pickup of the article 200 in the storage room 10 to pickup of the article 200 by the user 20. A case where target articles of the different users 20A, 20B, and 20C have been stored in the storage room 10 and the user 20A picks up the target article will be described below as an example. Further, the dedicated application has been installed in advance in the user terminals 21 carried by respective users 20, and key numbers to the storage room 10 have been registered individually by respective users 20.

First, the management server 31 transmits, to the edge GW 101, permission information to the users 20A, 20B, and 20C who are recipients of the articles stored in the storage room 10 (step S901). The permission information includes the MAC address of the user terminal 21, key information, a voucher number, a pickup date and time, or the like, for example. The MAC address is unique identification information (ID) for each user terminal 21. The voucher number is a voucher number of a target article associated with each user 20. The pickup date and time is a date and time specified by the user in step S18 of FIG. 10.

Next, the edge GW 101 stores the permission information on the users 20A, 20B, and 20C received from the management server 31 in the storage device 134 (step S902). Note that the process of step S901 to step S902 is performed in a predetermined cycle (for example, at an interval of 15 minutes). Accordingly, the permission information registered in the edge GW 101 is updated to the latest status. For example, when the article of the user 20D is newly distributed to the storage room 10, the permission information on the user 20D is added and registered to the storage device 134 of the edge GW 101.

Figure 14:
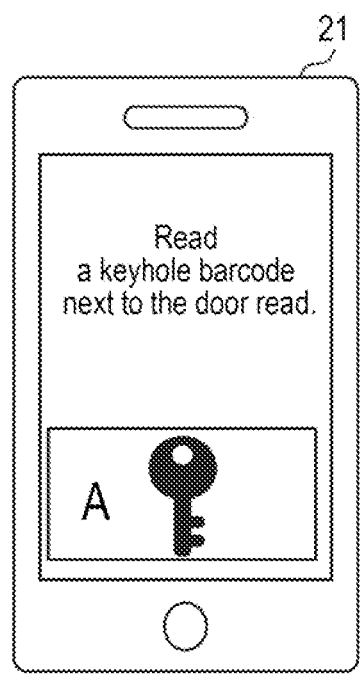
FIG. 14 is a diagram illustrating an example of a window displayed on the user terminal in the first example embodiment.

Next, the user terminal 21 starts up the dedicated application in accordance with the operation of the user 20A and accepts selection of key information made by the user 20A on the screen (step S903, see FIG. 13) and then displays a message that prompts the user 20A to get the keyhole seal 12 read (see FIG. 14).

Next, the user terminal 21 reads a two-dimensional barcode of the keyhole seal 12 (step S904) and then issues a connection request to the edge GW 101 (step S905). That is, the dedicated application of the user terminal 21 defines completion of reading of the two-dimensional barcode as the transmission condition for a connection request. Note that, when the user terminal 21 is present in communication coverages of a plurality of edge GWs 101, it is preferable for the user terminal 21 to issue a connection request targeted to the edge GW 101 having the highest radio intensity. In response to receiving the connection request from the user terminal 21, the edge GW 101 establishes communication connection with the user terminal 21 via wireless communication (step S906).

Next, the user terminal 21 transmits an authentication request to the edge GW 101 in accordance with a startup code recorded in the two-dimensional barcode (step S907). The authentication request includes the selected key information and authentication information including the MAC address of the user terminal 21.

Next, the edge GW 101 performs an authentication process on the user 20A based on the authentication request received from the user terminal 21 (step S908) and, once authenticating the user 20A, transmits an unlock signal to the electric lock 103 (step S909). Thereby, the electric lock 103 is unlocked, and the door 11 is ready to be opened and closed. Note that, if neither opening nor closure of the door 11 is detected for a certain period (for example, 5 seconds), the electric lock 103 is automatically locked. Also if the electric lock 103 is locked before the user 20A enters the room, it is possible for the user 20A to be re-authenticated by using the user terminal 21 to perform key selection and barcode reading again.

Once the user 20A opens the door 11, the electric lock 103 detects opening and closure of the door 11 and transmits an open/close notification to the edge GW 101 (step S910). Further, the open/close detection may be performed by an open/close sensor provided to the door 11.

Next, in response to authenticating the user 20A, the edge GW 101 extracts a storage place of the target article by searching for shelf allocation data stored in the storage device 134 by using the MAC address as a key and notifies the user terminal 21 of the extracted storage place (step S911). The user terminal 21 displays information on the storage place received from the edge GW 101 on the screen (step S912, see FIG. 16).

Next, the edge GW 101 performs an entry process (step S913). On the other hand, the user terminal 21 reads the barcode 201c written in the voucher 201 of the article 200 as illustrated in FIG. 7 in accordance with the operation performed by the user 20A who has entered the room (step S914) and then transmits read information to the edge GW 101 (step S915). The read information includes the voucher number of the article on reading and the MAC address of the user terminal 21 that has performed the reading, for example.

Next, the edge GW 101 performs a delivery confirmation process for the target article based on the received read information (step S916). In response to confirming delivery of the article 200 to the user 20A, the edge GW 101 permits the user 20A to exit the room. Specifically, the edge GW 101 sets the exit button 102 to an available state (active state).

Next, in response to detecting pressing of the exit button 102 in an active state, the edge GW 101 transmits an unlock signal to the electric lock 103 (step S917). Thereby, the electric lock 103 is unlocked, and the door 11 is ready to be opened and closed. If neither opening nor closure of the door 11 is detected for a certain period (for example, 5 seconds), the electric lock 103 is automatically locked. If the electric lock 103 is locked before the user 20A exits the room, it is possible for the user 20A to exit the room by pressing the exit button 102 again.

The user 20A opens the door 11, and the electric lock 103 then detects opening and closure of the door 11 and transmits the open/close notification to the edge GW 101 (step S918). In response to receiving the open/close notification about the door 11, the edge GW 101 performs an exit process (step S919).

Next, the edge GW 101 transmits, to the management server 31, delivery information on the target article related to the user 20A who has exited the room (step S920). The delivery information includes a voucher number of a target article and the MAC address of the user terminal 21, for example. In response to receiving the delivery information, the management server 31 updates the management information. Specifically, the status associated with the voucher number is updated to "delivered", and the enable flag is updated to "OFF".

The edge GW 101 then disconnects the wireless connection from the user terminal 21 (step S921) and deletes the permission information related to the user terminal 21, which was connected, from the storage device 134 (step S922). Note that, while the record may be deleted from the database 32, the enable flag associated with the MAC address may be set to "OFF". Accordingly, after taking the article out of the storage room 10, the user 20A is restricted to enter the storage room 10.

As described above, according to the present example embodiment, entry to the storage room 10 and exit from the storage room 10 made by the user 20 can be controlled based on wireless communication between the user terminal 21 carried by the user 20 and the edge GW 101 in the same manner as in the first example embodiment.

Fifth Example Embodiment

Figure 25:
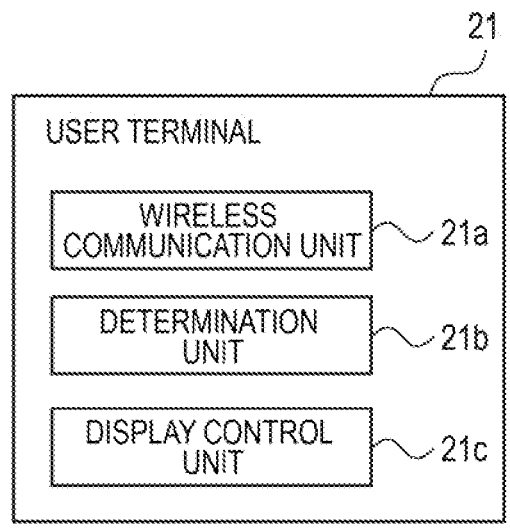
FIG. 25 is a block diagram illustrating a user terminal in a fifth example embodiment.

The delivery management system 1 in a fifth example embodiment will be described below. The present example embodiment differs from the first example embodiment in that the user terminal 21 further has a determination function and a display control function. FIG. 25 is a block diagram illustrating the user terminal 21 in the present example embodiment. As illustrated in FIG. 25, the user terminal 21 has a wireless communication unit 21a, a determination unit 21b, and a display control unit 21c. The function of each unit is implemented by the dedicated application installed in the user terminal 21.

The wireless communication unit 21a wirelessly communicates with the edge GW 101, the management server 31, the company server 33, and the like based on a communication specification such as Bluetooth, Wi-Fi, LTE, or the like. The determination unit 21b determines necessity of a window transition, a window content to be displayed on the display, or the like based on reception information from the edge GW 101. A specific example of the information received from the edge GW 101 may be, for example, the use status of the storage room 10, an error code (an error related to no registration of terminal identification information, an error related to invalidation of key information, an error of wireless connection to the edge GW 101, or the like), data of a processed result in the edge GW 101, or the like. The display control unit 21c controls the window content to be displayed on the display based on a determination result from the determination unit 21b.

The determination unit 21b can receive, from the edge GW 101, reception information indicating that any of users 20 is using the storage room 10 at a timing when wireless connection between the wireless communication unit 21a and the edge GW 101 is established, for example. In such a case, the determination unit 21b determines not to allow a transition to the barcode reading window in the dedicated application. Based on the determination result, the display control unit 21c may then display a message such as "The room is occupied. No entry now.", "The room is occupied. No barcode reading now.", or the like in the window and change the window content so that a transition to the barcode reading window is disabled. Accordingly, in a situation where entry to the storage room 10 is restricted, the user 20 is not required to move to the front of the storage room 10 and use and operate the user terminal 21 to read the keyhole seal 12, and the user 20 can be notified of a message on the screen indicating that entry to the room is not allowed.

Sixth Example Embodiment

Figure 26:
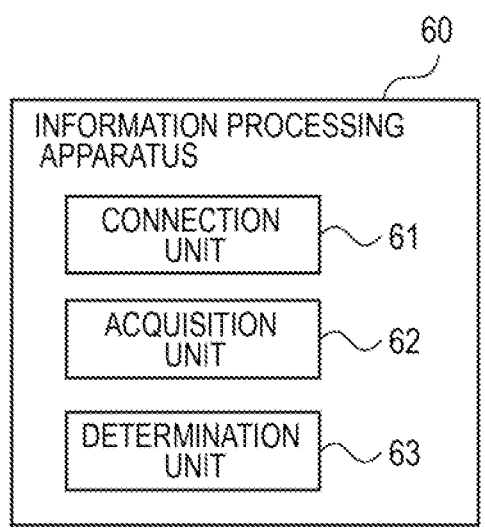
FIG. 26 is a block diagram illustrating an information processing apparatus in a sixth example embodiment.

FIG. 26 is a block diagram illustrating an information processing apparatus 60 in a sixth example embodiment. The information processing apparatus 60 has a connection unit 61 that establishes connection to a user terminal by wireless communication, an acquisition unit 62 that acquires terminal identification information transmitted from the user terminal via the wireless communication when the user terminal has read an image used for a request for entry to a control target area, and a determination unit 63 that determines whether or not to permit a user carrying the user terminal to enter the control target area based on the terminal identification information. According to the information processing apparatus 60 in the present example embodiment, it is possible to ensure security in control of entry to a control target area.

Seventh Example Embodiment

Figure 27:
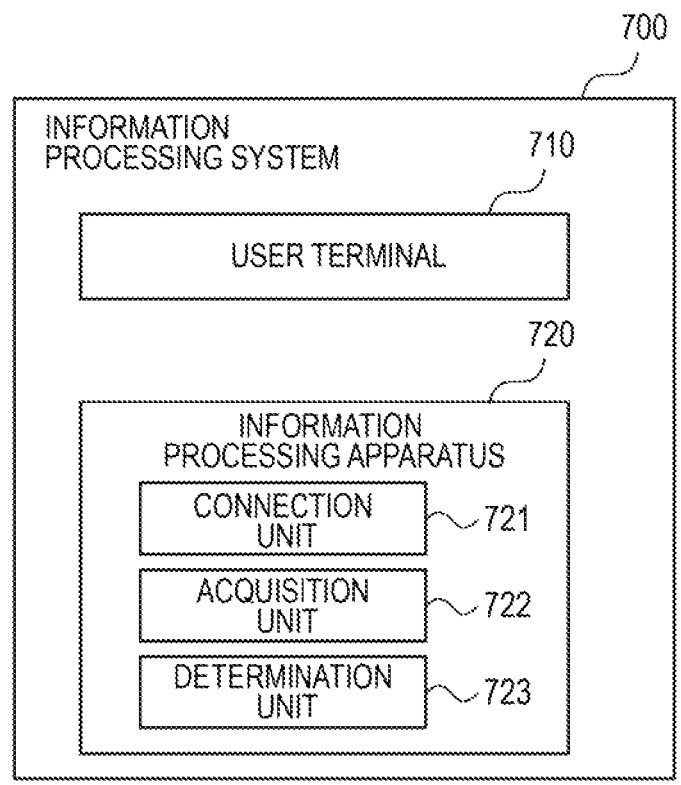
FIG. 27 is a block diagram illustrating an information processing system in a seventh example embodiment.

FIG. 27 is a block diagram illustrating an information processing system 700 in a seventh example embodiment. The information processing system 700 has a user terminal 710 carried by a user and having a function of reading an image used for a request for entry to a control target area and an information processing apparatus 720 that wirelessly communicates with the user terminal 710. The information processing apparatus 720 has a connection unit 721 that establishes connection to the user terminal 710 by wireless communication, an acquisition unit 722 that acquires terminal identification information transmitted from the user terminal 710 via the wireless communication that has read the image, and a determination unit 723 that determines whether or not to permit the user to enter the control target area based on the terminal identification information. According to the information processing system 700 in the present example embodiment, it is possible to ensure security in control of entry to a control target area.

Modified Example Embodiment

Although the present invention has been described above with reference to the example embodiments, the present invention is not limited to the example embodiments described above. Various modifications that can be understood by those skilled in the art can be made to the configuration and details of the present invention within the scope not departing from the spirit of the present invention. For example, it should be understood that an example embodiment in which a configuration of a part of any of the example embodiments is added to another example embodiment or replaced with a configuration of a part of another example embodiment is an example embodiment to which the present invention may be applied.

For example, in the first example embodiment described above, the article 200 is stored in the storage room 10, and when the door 11 of the storage room 10 is unlocked, the user 20 is permitted to enter the storage room 10 and exit the storage room 10. However, the control target area is not limited to a separate space surrounded by walls, a floor, and a ceiling as with the storage room 10 and may be a space where some of the walls is opened. For example, as a control target area, a delivery space partitioned by partitions or the like may be installed in a corner of a shop. Furthermore, a passage restriction apparatus may be installed at the entrance of the control target area in order to restrict entry and exit of a user to and from the control target area. The passage restriction apparatus is a left-right open/closure type gate apparatus, for example, which is normally closed and is controlled by the edge GW 101 to be opened when the user is permitted to enter and exit the control target area. The passage restriction apparatus may have an electric lock 103. Any configuration of the passage restriction apparatus may be employed, and the door 11 in the example embodiments described above is also included in the category of the passage restriction apparatus.

Further, although it is determined whether or not to permit the entry of the user 20 to the room based on whether or not the storage room 10 is vacant in the first example embodiment described above, an example embodiment may be configured to permit a plurality of persons carrying the user terminals 21, which are different from each other, to enter the room at the same time. For example, in the storage room 10 storing bicycles or the like, it may be possible to permit entry to the room when the number of users 20 present in the room is less than a predetermined maximum number of users (upper limit number of occupying users).

Further, although the arrangement of articles is acquired from the shelf image only when the user is entering and exiting the room in the example embodiments described above, the edge GW 101 may acquire a shelf image at any timing to confirm the arrangement of articles while the user 20 is present in the room. The edge GW 101 compares a list of the articles 200 created and stored at entry to the room (first list) with a newly created list of the articles 200 (second list), matches voucher numbers of the lists with each other, and thereby can recognize the article 200 not included in the second list from the articles 200 included in the first list. The edge GW 101 can determine that the article 200 not included in the second list has been taken by the user 20 out of the shelf 13. Further, when information in the shelf label 13*a* associated with the same voucher number is different between lists, the edge GW 101 can determine that the article 200 of the voucher number has been moved by the user 20. These determination results can be used for unlock control of the electric lock 103 and notification to the user terminal 21.

Figure 28:
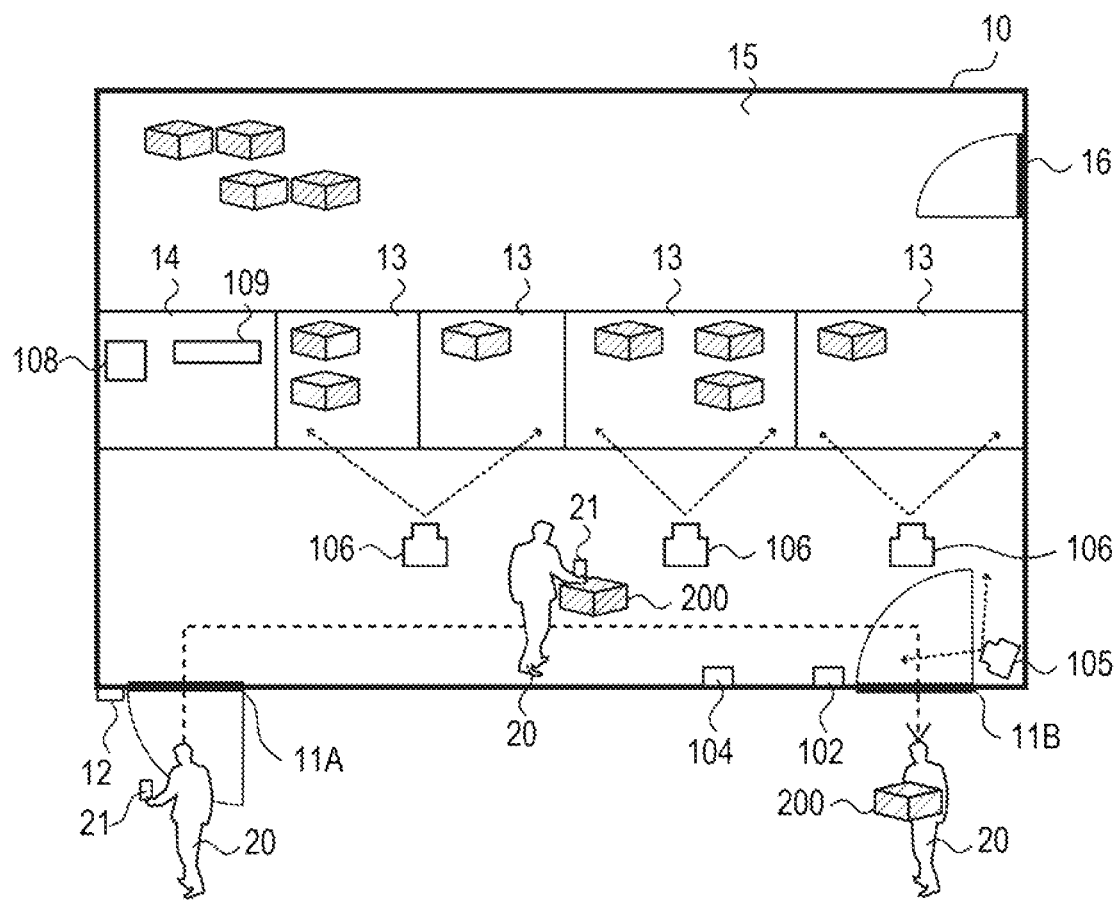
FIG. 28 is a plan view of a storage room in a modified example embodiment.

Further, although the case where the storage room 10 has one entrance has been illustrated as an example in the above example embodiments, the number of entrances is not limited to one. FIG. 28 is a plan view of the storage room 10 in the present example embodiment. The storage room 10 is a walk-through type room and has an entry-only door 11A and an exit-only door 11B. In the storage room 10, a plurality of shelves 13 are arranged side by side, and a backyard 15 used for storing an article not accommodated in the shelves 13 is provided behind the plurality of shelves 13. Only the salesclerk of the shop or the distributor worker of a logistics company can enter the backyard 15 via the control door 16. In the storage room 10, while moving from the entry door 11A to the exit door 11B, the user 20 takes its own article 200 out of the shelves 13 in accordance with a guidance mail notified to the user terminal 21 or guidance made by the display 109 and the audio terminal 108. Since the shelf cameras 106 are provided for on a single or multiple shelves 13 basis, inclusion of the user 20 in the view angles of the shelf cameras 106 is reduced.

Further, in the example embodiments described above, the edge GW 101 determines whether or not to permit entry to the storage room 10 by matching list information on MAC addresses of the user terminals 21 carried by the users 20 having passage authority with a MAC address acquired from the user terminal 21 that has read the image of the keyhole seal 12. However, there may be an example embodiment in which the edge GW 101 does not store list information in the storage device 134. For example, the edge GW 101 may acquire list information from the management server 31 at a timing of receiving authentication information from the user terminal 21. Further, the edge GW 101 may determine whether or not to permit entry to the storage room 10 by matching list information on MAC addresses of the user terminals 21 that have already established wireless connection currently with a MAC address acquired from the user terminal 21 that has read the image of the keyhole seal 12. For example, when the dedicated application is installed in only the user terminals 21 of the users 20 having passage authority and the user terminals 21 can wirelessly connect to the edge GW 101, it is possible to perform determination of passage permission on the user 20 of the user terminal 21 which has read the image of the keyhole seal 12 out of the terminals wirelessly connected to the edge GW 101.

The scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:

a connection unit that establishes connection to a user terminal by wireless communication;

an acquisition unit that acquires terminal identification information transmitted from the user terminal via the wireless communication when the user terminal read an image used for a request for entry to a control target area; and a determination unit that determines whether or not to permit a user carrying the user terminal to enter the control target area based on the terminal identification information.

(Supplementary Note 2)

The information processing apparatus according to supplementary note 1, wherein the determination unit permits the user to enter the control target area when the terminal identification information is associated with a particular article in the control target area.

(Supplementary Note 3)

The information processing apparatus according to supplementary note 2, wherein the acquisition unit acquires article identification information transmitted from the user terminal via the wireless communication when the user terminal read a recording medium attached to the article, and wherein the determination unit permits the user to exit the control target area when the article identification information is associated with the terminal identification information.

(Supplementary Note 4)

The information processing apparatus according to supplementary note 2 or 3, wherein the determination unit refuses entry of a person other than the user to the control target area while the user is present in the control target area.

(Supplementary Note 5)

The information processing apparatus according to any one of supplementary notes 2 to 4 further comprising a notification unit that notifies the user terminal, which is associated with the user permitted to enter the control target area, of a storage place of the article in the control target area.

(Supplementary Note 6)

The information processing apparatus according to any one of supplementary notes 1 to 5 further comprising an output unit that outputs alert information when a staying time period in which the user is present in the control target area exceeds a predetermined time period.

(Supplementary Note 7]
The information processing apparatus according to any one of supplementary notes 1 to 6 further comprising a storage unit that stores the terminal identification information associated with the user authorized to enter the control target area,
wherein the determination unit permits the user to enter the control target area when the terminal identification information stored in the storage unit matches the terminal identification information acquired by the acquisition unit.
(Supplementary Note 8)
The information processing apparatus according to supplementary note 7,
wherein the storage unit stores key information corresponding to the control target area in association with the terminal identification information,
wherein the acquisition unit acquires the terminal identification information and the key information from the user terminal, and
wherein the determination unit determines whether or not to permit the user to enter the control target area based on the terminal identification information and the key information.
(Supplementary Note 9)
The information processing apparatus according to supplementary note 8 further comprising a deletion unit that deletes the key information from the storage unit when the user exits the control target area.
(Supplementary Note 10)
An information processing method comprising:
establishing connection to a user terminal by wireless communication;
acquiring terminal identification information transmitted from the user terminal via the wireless communication when the user terminal read an image used for a request for entry to a control target area; and
determining whether or not to permit a user carrying the user terminal to enter the control target area based on the terminal identification information.
(Supplementary Note 11)
A storage medium storing a program that causes a computer to perform:
establishing connection to a user terminal by wireless communication;
acquiring terminal identification information transmitted from the user terminal via the wireless communication when the user terminal read an image used for a request for entry to a control target area; and
determining whether or not to permit a user carrying the user terminal to enter the control target area based on the terminal identification information.
(Supplementary Note 12)
An information processing system comprising:
a user terminal carried by a user and having a function of reading an image used for a request for entry to a control target area; and
an information processing apparatus that wirelessly communicates with the user terminal,
wherein the information processing apparatus includes
a connection unit that establishes connection to the user terminal by the wireless communication,
an acquisition unit that acquires terminal identification information transmitted via the wireless communication from the user terminal that read the image, and
a determination unit that determines whether or not to permit the user to enter the control target area based on the terminal identification information.

This application is based upon and claims the benefit of priority from Japanese Patent Application No. 2018-205060, filed on Oct. 31, 2018, the disclosure of which is incorporated herein in its entirety by reference.

REFERENCE SIGNS LIST 1 delivery management system
10 storage room (control target area)
11 door
12 keyhole seal (sign member)
13 shelf
13a shelf label
13b back plate
14 guidance table
15 backyard
16 control door
101 edge GW
102 exit button
103 electric lock
104 telephone
105 live camera
106 shelf camera
107 hub
108 audio terminal
109 display
110 router
131 CPU
132 RAM
133 ROM
134 storage device
135 input/output I/F
20, 20A, 20B, 20C, 20D user
21 user terminal
21a wireless communication unit
21b determination unit
21c display control unit
200 article
201 voucher
31 management server
32 database
33 company server
34 database
41 EC server
60 information processing apparatus
61 connection unit
62 acquisition unit
63 determination unit
700 information processing system
710 user terminal
720 information processing apparatus
721 connection unit
722 acquisition unit
723 determination unit

What is claimed is:
1. An information processing system comprising:
a user terminal carried by a user and having a function of reading an image used for a request for entry to a control target area; and
an information processing apparatus that wirelessly communicates with the user terminal,
wherein the information processing apparatus includes
a memory configured to store instructions; and
a processor configured to execute the instructions to:
connect to the user terminal by the wireless communication, acquire terminal identification information transmitted via the wireless communication from the user terminal that reads the image, and determine whether or not to permit the user to enter the control target area based on the terminal identification information, wherein the processor is configured to execute the instructions to permit the user to enter the control target area when the terminal identification information is associated with a particular article in the control target area.

2. An information processing apparatus comprising:

a memory configured to store instructions; and a processor configured to execute the instructions to:

connect to a user terminal by wireless communication;

acquire terminal identification information transmitted from the user terminal via the wireless communication when the user terminal reads an image used for a request for entry to a control target area; and determine whether or not to permit a user carrying the user terminal to enter the control target area based on the terminal identification information, wherein the processor is configured to execute the instructions to permit the user to enter the control target area when the terminal identification information is associated with a particular article in the control target area.

3. The information processing apparatus according to claim 2, wherein the processor is configured to execute the instructions to acquire article identification information transmitted from the user terminal via the wireless communication when the user terminal reads a recording medium attached to the article, and permit the user to exit the control target area when the article identification information is associated with the terminal identification information.

4. The information processing apparatus according to claim 2, wherein the processor is configured to execute the instructions to refuse entry of a person other than the user to the control target area while the user is present in the control target area.

5. The information processing apparatus according claim 2, wherein the processor is further configured to execute the instructions to notify the user terminal, which is associated with the user permitted to enter the control target area, of a storage place of the article in the control target area.

6. The information processing apparatus according to claim 2, wherein the processor is further configured to execute the instructions to output alert information when a staying time period in which the user is present in the control target area exceeds a predetermined time period.

7. The information processing apparatus according to claim 2, further comprising a storage that stores the terminal identification information associated with the user authorized to enter the control target area, wherein the processor is configured to execute the instructions to permit the user to enter the control target area when the terminal identification information stored in the storage matches the terminal identification information acquired.

8. The information processing apparatus according to claim 7, wherein the storage stores key information corresponding to the control target area in association with the terminal identification information, wherein the processor is configured to execute the instructions to acquire the terminal identification information and the key information from the user terminal, and determine whether or not to permit the user to enter the control target area based on the terminal identification information and the key information.

9. The information processing apparatus according to claim 8, wherein the processor is further configured to execute the instructions to delete the key information from the storage when the user exits the control target area.

10. An information processing method comprising:

connecting to a user terminal by wireless communication;

acquiring terminal identification information transmitted from the user terminal via the wireless communication when the user terminal reads an image used for a request for entry to a control target area;

determining whether or not to permit a user carrying the user terminal to enter the control target area based on the terminal identification information; and permitting the user to enter the control target area when the terminal identification information is associated with a particular article in the control target area.

11. A non-transitory storage medium storing a program that causes a computer to perform the information processing method according to claim 10.

* * * * *